(12) United States Patent
Iihoshi et al.

(10) Patent No.: US 7,255,093 B2
(45) Date of Patent: Aug. 14, 2007

(54) DEVICE AND METHOD FOR DIAGNOSING EVAPORATION LEAK, AND CONTROL DEVICE OF INTERNAL COMBUSTION ENGINE

(75) Inventors: Yoichi Iihoshi, Tsuchiura (JP); Shinji Nakagawa, Hitachinaka (JP); Toshio Hori, Hitachinaka (JP); Akira Hikichi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/563,099

(22) PCT Filed: Feb. 6, 2004

(86) PCT No.: PCT/JP2004/001290

§ 371 (c)(1),
(2), (4) Date: Dec. 30, 2005

(87) PCT Pub. No.: WO2005/001273

PCT Pub. Date: Jan. 6, 2005

(65) Prior Publication Data

US 2006/0144370 A1 Jul. 6, 2006

(30) Foreign Application Priority Data

Jun. 30, 2003 (JP) .............................. 2003-186079

(51) Int. Cl.
*F02M 33/02* (2006.01)
*F02M 1/00* (2006.01)
(52) U.S. Cl. ...................................... 123/518; 123/520

(58) Field of Classification Search ................ 123/518, 123/519, 520
See application file for complete search history.

(56) References Cited

U.S. PATENT DOCUMENTS

| 4,669,426 | A | * | 6/1987 | Hirano et al. ............. 123/41.15 |
| 5,411,004 | A | * | 5/1995 | Busato et al. ................ 123/520 |
| 5,575,265 | A | | 11/1996 | Kurihara et al. |
| 5,679,890 | A | * | 10/1997 | Shinohara et al. .......... 73/118.1 |
| 5,975,062 | A | * | 11/1999 | Bonse et al. ................. 123/519 |
| 6,119,663 | A | * | 9/2000 | Okuma ......................... 123/520 |
| 2001/0054415 | A1 | | 12/2001 | Hanai et al. |

FOREIGN PATENT DOCUMENTS

| DE | 195 27 367 A1 | 7/1995 |
| JP | 05-195883 | 8/1993 |
| JP | 07-189825 | 7/1995 |
| JP | 8-35452 | 2/1996 |
| JP | 10-104114 | 4/1998 |
| JP | 2002-81349 | 3/2002 |
| JP | 2002-138910 | 5/2002 |
| JP | 2003-155959 | 5/2003 |

* cited by examiner

*Primary Examiner*—John T. Kwon
(74) *Attorney, Agent, or Firm*—Mattingly, Stanger, Malur & Brundidge, P.C.

(57) ABSTRACT

Pressure detection means detects the pressure of an evaporation purge system that includes a fuel tank and a communicating tube, which connects a canister for adsorbing and retaining fuel vapor to an intake pipe. Shutout means shuts out the evaporation purge system from atmospheric air. A pump is driven for pressurization or depressurization purposes while the shutout means shuts out the evaporation purge system from atmospheric air. The pump is stopped when the pressure detected by the pressure detection means reaches a predetermined level. A leak judgment is formulated in accordance with pump drive time and a pressure change after pump stoppage.

21 Claims, 14 Drawing Sheets

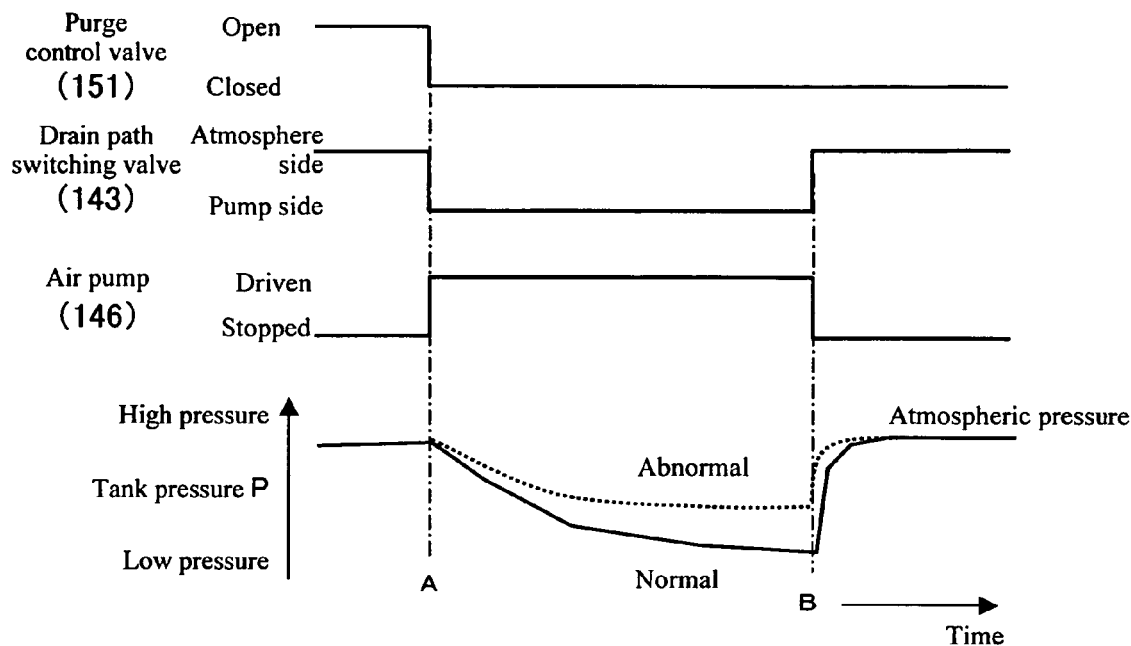
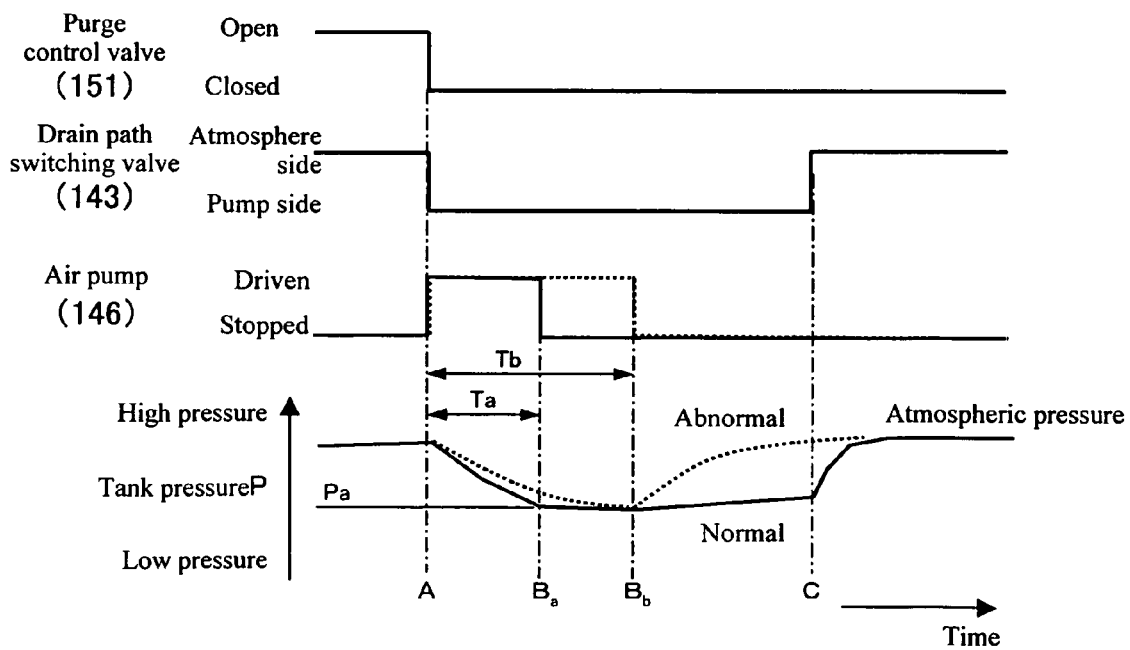

US 7,255,093 B2

DEVICE AND METHOD FOR DIAGNOSING EVAPORATION LEAK, AND CONTROL DEVICE OF INTERNAL COMBUSTION ENGINE

TECHNICAL FIELD

The present invention relates to an evaporation leak diagnostic device and method for detecting a fuel vapor leak that may occur in a fuel tank of a gasoline engine mounted automobile or other similar vehicle and to an internal combustion engine control device.

BACKGROUND ART

Means (negative pressure method) for judging a leak in accordance with pressure changes occurring when an evaporation purge system is placed under negative pressure is well known as a conventional technology for detecting a leak from the evaporation purge system for a fuel tank of an automobile or other vehicle (e.g., Japanese Patent JP-B 2741698 and Japanese Patent JP-A 189825/1995).

However, the use of the negative pressure method has not provided an adequate diagnosis frequency in the market. One reason is that the negative pressure is insufficient during a high-load operation. To solve this problem, a method for installing a pump in a purge line between a canister and intake pipe and operating the pump to generate a negative pressure for diagnosis purposes is disclosed (refer, for instance, to Japanese Patent JP-A 138910/2002 and Japanese Patent JP-A 349364/2002).

To increase the diagnosis frequency in the market, however, it is important to establish measures for preventing a diagnosis error due to evaporation, and more particularly to establish measures for preventing a diagnosis error due to fuel level undulation (slosh). The above-mentioned technologies do not provide any solution to establish such measures.

A conventional evaporation purge system for a fuel tank will now be described with reference to FIG. 23.

A fuel tank stores gasoline or other liquid hydrocarbon fuel. The fuel tank 500 is equipped with a liquid level sensor 501. The liquid level sensor 501 converts a fuel level into an electrical signal, which enters a control unit 503. The fuel tank 500 is equipped with a pressure sensor 502, which measures the internal pressure of the fuel tank. The pressure sensor 502 converts the pressure difference between the vapor section of the fuel tank 500 and the outside of the fuel tank (atmospheric pressure) into an electrical signal and feeds the electrical signal to the control unit 503.

An evaporation purge system includes a canister 504. The canister 504 contains and adsorbent that adsorbs and retains fuel vapor. A communicating tube 510 is connected between the canister 504 and the vapor section of the fuel tank 500. Vapor that arises when the fuel in the fuel tank 500 evaporates is adsorbed and retained by the canister 504. The canister 504 prevents the vapor from being discharged into the atmosphere.

The canister 504 is equipped with a drain control valve 505. The drain control valve 505 opens and closes in accordance with an electrical signal from the control unit 503.

Therefore, when the drain control valve 505 opens while the vehicle is driven, the fuel vapor generated within the fuel tank 500 is introduced into the canister 504 and adsorbed by the canister 504.

The canister 504 communicates with an intake pipe 509 of an internal combustion engine 508 via a communicating tube 507. A purge control valve 506 is installed in the middle of the communicating tube 507. The purge control valve 506 is driven by an electrical signal from the control unit 503 so that the opening of the purge control valve 506 can be controlled.

The internal combustion engine 508 generates a negative pressure in the intake pipe 509 within a low- to medium-load operating range. Therefore, when the opening of the purge control valve 506 is adjusted as specified with the drain control valve 505 opened in such a state, outside air is introduced into the canister 504. The adsorbed vapor is then desorbed and introduced into the intake pipe 509. The introduced outside air and vapor are burned together with normal intake air and supplied fuel in the internal combustion engine 508.

A leak detection sequence based on a conventional negative pressure method will now be described with reference to FIG. 24. FIG. 24 is a typical timing diagram. This diagram illustrates operations that the drain control valve 505 and purge control valve 506 perform for evaporation leak diagnosis as well as a tank pressure that is detected by the pressure sensor 502.

Between time A and time B, the drain control valve 505 closes and the purge control valve 506 opens. The negative pressure generated in the intake pipe 509 of the internal combustion engine 508 then reduces the pressure within the fuel tank 500. When the tank pressure decreases to a predetermined level (at time B), the purge control valve 506 closes to hermetically seal the evaporation purge system. If the gradient of tank pressure increase is great before time C is reached, it is judged that there is a leak. Further, the diameter of a leak hole is determined according to the magnitude of the gradient.

However, if a slosh occurs during the use of the conventional negative pressure method, a leak may be erroneously detected due to the influence of evaporation pressure even when there is no leak. Therefore, when the conventional negative pressure method is used, it is necessary to detect a slosh and disable or mask the diagnostic function. That is why it has been difficult to provide an adequate diagnosis frequency in the market.

The present invention has been made in view of the above circumstances. It is an object of the present invention to provide an evaporation leak diagnostic device that is capable of making diagnoses without being affected by a slosh, and increase the diagnosis accuracy and frequency in the market. It is another object of the present invention to judge the properties of the fuel in the fuel tank by making effective use of information generated by the evaporation leak diagnostic device, and provide increased stability and improved exhaust at the time of engine startup.

DISCLOSURE OF THE INVENTION

According to one aspect of the present invention, there is provided an evaporation leak diagnostic device for detecting a fuel vapor leak in an internal combustion engine having an evaporation purge system that includes a fuel tank and a communicating tube, which connects a canister for adsorbing and retaining fuel vapor to an intake pipe, the evaporation leak diagnostic device comprising: pressure detection means for detecting the pressure of the evaporation purge system; shutout means for shutting out the evaporation purge system from atmospheric air; a pump for pressurizing or depressurizing the evaporation purge system; and leak judgment means for driving the pump while the shutout means shuts out the evaporation purge system from atmospheric air, stopping the pump when the pressure detected by the pressure detection means reaches a predetermined level, and formulating a leak judgment in accordance with the time for driving the pump and a pressure change encountered after pump stoppage.

In the above instance, the leak judgment means may judge that there is a leak (formulates an abnormality judgment) only when the time for driving the pump is longer than the threshold pump drive time and the pressure change encountered after pump stoppage is greater than the threshold pressure change. Under the other conditions, the leak judgment means may judge that there is no leak (formulates a normality judgment).

Further, the leak judgment means may set the threshold pump drive time and threshold pressure change in accordance with the amount of fuel remaining in the fuel tank at the time of leak judgment.

According to another aspect of the present invention, there is provided an evaporation leak diagnostic device for detecting a fuel vapor leak in an internal combustion engine having an evaporation purge system that includes a fuel tank and a communicating tube, which connects a canister for adsorbing and retaining fuel vapor to an intake pipe, the evaporation leak diagnostic device comprising: pressure detection means for detecting the pressure of the evaporation purge system; shutout means for shutting out the evaporation purge system from atmospheric air; a pump for pressurizing or depressurizing the evaporation purge system; and leak judgment means for driving the pump for a predetermined period of time while the shutout means shuts out the evaporation purge system from atmospheric air, and formulating a leak judgment in accordance with a pressure change that the pressure detection means detects during pump drive and the amount of pressure change during a predetermined period of time after pump stoppage.

In the above instance, the leak judgment means may judge that there is a leak (formulates an abnormality judgment) only when the amount of pressure change during the pump drive is greater than the threshold pressure change during the pump drive and the amount of pressure change during a predetermined period of time after pump stoppage is greater than the threshold amount of pressure change after pump stoppage. Under the other conditions, the leak judgment means may judge that there is no leak (formulates a normality judgment).

Further, the leak judgment means may set the pump drive time in accordance with the amount of fuel remaining in the fuel tank at the time of leak judgment. The leak judgment means may also estimate the charge amount of vapor adsorbed by the canister and correct the pump drive time setting in accordance with the estimated charge amount. Moreover, the leak judgment means may estimate the amount of vapor generation in the fuel tank and correct the pump drive time setting in accordance with the estimated amount of vapor generation.

The charge amount of vapor can be estimated in accordance with a fuel tank temperature history.

In the evaporation leak diagnostic device according to the above aspects of the present invention, the leak judgment means formulates a leak judgment while the internal combustion engine is stopped.

In the evaporation leak diagnostic device according to the above aspects of the present invention, the leak judgment means causes the shutout means to close the evaporation purge system while the internal combustion engine is stopped, and disables a leak judgment function when the pressure change measured without driving the pump is greater than a predetermined value. Further, when the estimated charge amount of vapor adsorbed by the canister is greater than a predetermined value, the leak judgment means disables the leak judgment function without driving the pump.

According to another aspect of the present invention, there is provided an evaporation leak diagnostic method for detecting a fuel vapor leak in an internal combustion engine having an evaporation purge system that includes a fuel tank and a communicating tube, which connects a canister for adsorbing and retaining fuel vapor to an intake pipe, the evaporation leak diagnostic method comprising the steps of: causing pressure detection means to detect the pressure of the evaporation purge system; causing shutout means to shut out the evaporation purge system from atmospheric air; driving a pump for pressurization or depressurization purposes while the shutout means shuts out the evaporation purge system from atmospheric air; stopping the pump when the pressure detected by the pressure detection means reaches a predetermined level; and formulating a leak judgment in accordance with the drive time for the pump and a pressure change encountered after pump stoppage.

In the above instance, it is judged that there is a leak (an abnormality judgment is formulated) only when the drive time for the pump is longer than the threshold pump drive time and the pressure change after pump stoppage is greater than the threshold pressure change. Under the other conditions, it is judged that there is no leak (a normality judgment is formulated).

According to another aspect of the present invention, there is provided an evaporation leak diagnostic method for detecting a fuel vapor leak in an internal combustion engine having an evaporation purge system that includes a fuel tank and a communicating tube, which connects a canister for adsorbing and retaining fuel vapor to an intake pipe, the evaporation leak diagnostic method comprising the steps of: causing pressure detection means to detect the pressure of the evaporation purge system; driving a pump for a predetermined period of time while the shutout means shuts out the evaporation purge system from atmospheric air in order to pressurize or depressurize the evaporation purge system; and formulating a leak judgment in accordance with the amount of pressure change that the pressure detection means detects during pump drive and the amount of pressure change during a predetermined period of time after pump stoppage.

In the above instance, it is judged that there is a leak (an abnormality judgment is formulated) only when the amount of pressure change during the pump drive is greater than a threshold amount of pressure change during the pump drive and the amount of pressure change during a predetermined period of time after pump stoppage is greater than a threshold amount of pressure change after pump stoppage. Under the other conditions, it is judged that there is no leak (a normality judgment is formulated).

When the evaporation leak diagnostic method according to the above aspects of the present invention is used, a leak judgment is formulated while the internal combustion engine is stopped.

According to still another aspect of the present invention, there is provided an internal combustion engine control device for adjusting the amount of fuel injection for engine startup in accordance with fuel properties, the internal combustion engine control device comprising: pressure detection means for detecting the pressure of an evaporation purge system that includes a fuel tank and a communicating tube, which connects a canister to an intake pipe; shutout means for shutting out the evaporation purge system from atmospheric air; and a pump for depressurizing the evaporation purge system. The internal combustion engine control device judges fuel properties in accordance with a pressure change that is encountered when the pump is driven with the evaporation purge system closed, and adjusts the amount of fuel injection for engine startup.

The fuel properties should be judged when the fuel tank temperature is high (e.g., immediately after vehicle stoppage).

When the pressure change during pump drive is greater than a predetermined standard value for heavy gasoline or when the pump drive time required before a predetermined pressure is reached is smaller than a predetermined standard value for heavy gasoline, it is possible to judge that the fuel in the fuel tank is light and select a startup fuel injection amount that is smaller than for heavy gasoline.

Consequently, the present invention makes it possible, for instance, to reduce the required diagnosis time, prevent vapor from being discharged out of the vehicle, prevent the tank from deteriorating, and prevent the battery from being exhausted. Further, when diagnoses are made in accordance with pressure changes that are encountered while the pump is driven or stopped, the present invention makes it possible, for instance, to avoid a diagnosis error due to evaporation, avoid a diagnosis error at the time of canister pressure loss increase, and avoid a diagnosis error at the time of pump deterioration. Further, it can be expected that the present invention will reduce the amount of exhaust while judging fuel properties to assure stable startup performance. Moreover, the present invention makes it possible to judge the properties of fuel in the fuel tank by making effective use of information generated by the evaporation leak diagnostic device and provide increased stability and improved exhaust at the time of engine startup.

BRIEF DESCRIPTION OF DRAWINGS

FIG. 3 is a timing diagram illustrating a typical evaporation leak diagnostic process.

FIG. 4 is a timing diagram illustrating one embodiment of an evaporation leak diagnostic process according to the present invention.

BEST MODE FOR CARRYING OUT THE INVENTION

Preferred embodiments of the present invention will now be described with reference to the accompanying drawings.

Figure 1:
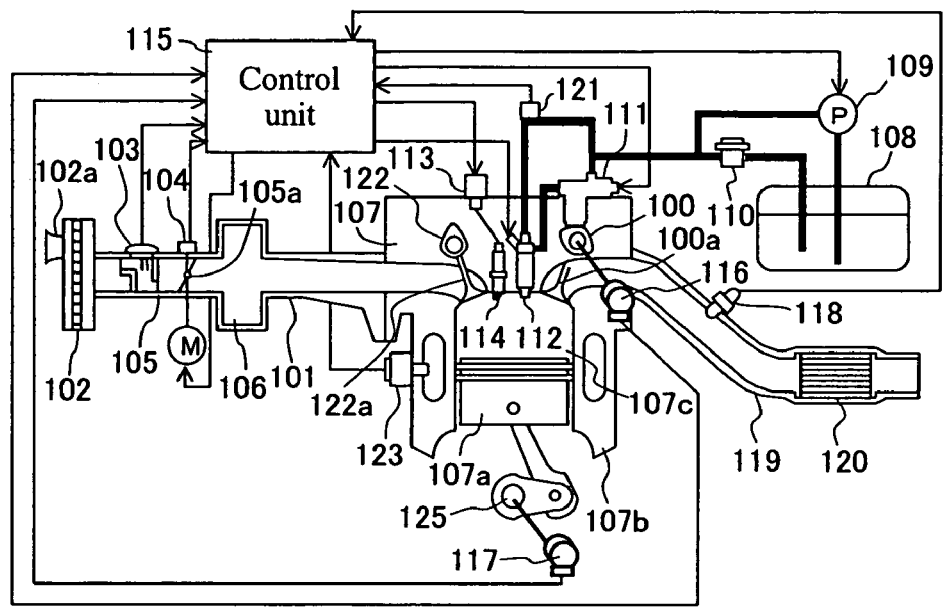
FIG. 1 illustrates an overall configuration of an internal combustion engine control system according to the present invention.

First of all, a typical vehicle internal combustion engine system according to the present invention will be described with reference to FIG. 1.

An in-cylinder injection internal combustion engine 107 includes a cylinder body 107b. The cylinder body 107b includes a plurality of combustion chambers 107c (one of them is shown in FIG. 1). Each combustion chamber 107c is equipped with an injector 112, which provides fuel injection.

Intake air, which is introduced into the combustion chamber 107c of the internal combustion engine 107, is acquired via an inlet 102a of an air cleaner 102. The intake air then passes through an air flow sensor 103, which is one of a plurality of operating status measurement means of the internal combustion engine 107, passes through a throttle body 105, which houses an electrically controlled throttle valve 105a for intake air flow rate control, enters a collector 106, becomes distributed to each intake pipe 101 connected to each combustion chamber 107c of the internal combustion engine 107, and becomes introduced into each combustion chamber 107c.

The air flow sensor 103 outputs a signal for indicating the intake air flow rate to a control unit 115, which is an internal combustion engine control device. The throttle body 105 is provided with a throttle sensor 104, which detects the opening of the electrically controlled throttle valve 105a as one of the plurality of operating status measurement means of the internal combustion engine. The signal output from the throttle sensor 104 is also delivered to the control unit 115.

Gasoline or other liquid fuel in a fuel tank 108 is subjected to primary pressurization by a fuel pump 109, adjusted for a predetermined pressure by a fuel pressure regulator 110, and subjected to secondary pressurization by a high-pressure fuel pump 111. The resulting high-pressure fuel is force-fed to a common rail (not shown). The force-fed fuel is then injected into the combustion chamber 107c from the injector 112.

After the fuel is injected into the combustion chamber 107c, an ignition coil 113 applies a high voltage to an ignition plug 114, which provides a spark discharge, and then the ignition plug 114 ignites the fuel.

A cam angel sensor 116, which is installed over a camshaft 100 for an exhaust valve 100a, outputs a camshaft phase detection signal to the control unit 115. The cam angle sensor 116 may alternatively be installed over a camshaft 122 for an intake valve 122a. Further, a crank angle sensor 117 is installed over a crankshaft 125 to detect the rotation and phase of an internal combustion engine crankshaft. The output from the crank angle sensor 117 enters the control unit 115.

A water temperature sensor 123 is mounted in the cylinder body 107b of the internal combustion engine 107. The water temperature sensor 123 detects a cooling water temperature of the internal combustion engine and outputs the resulting detection signal to the control unit 115.

An air-fuel ratio sensor 118, which is positioned upstream of a catalyst 120 in an exhaust pipe 119, detects oxygen in an exhaust gas and outputs the resulting detection signal to the control unit 115.

Although an in-cylinder injection internal combustion engine has been described, the present invention is not limited to a case where an in-cylinder injection internal combustion engine is used. The present invention can also be applied to a port injection internal combustion engine whose injector 112 is mounted in an intake port and to a diesel engine without an ignition plug 114.

Figure 2:
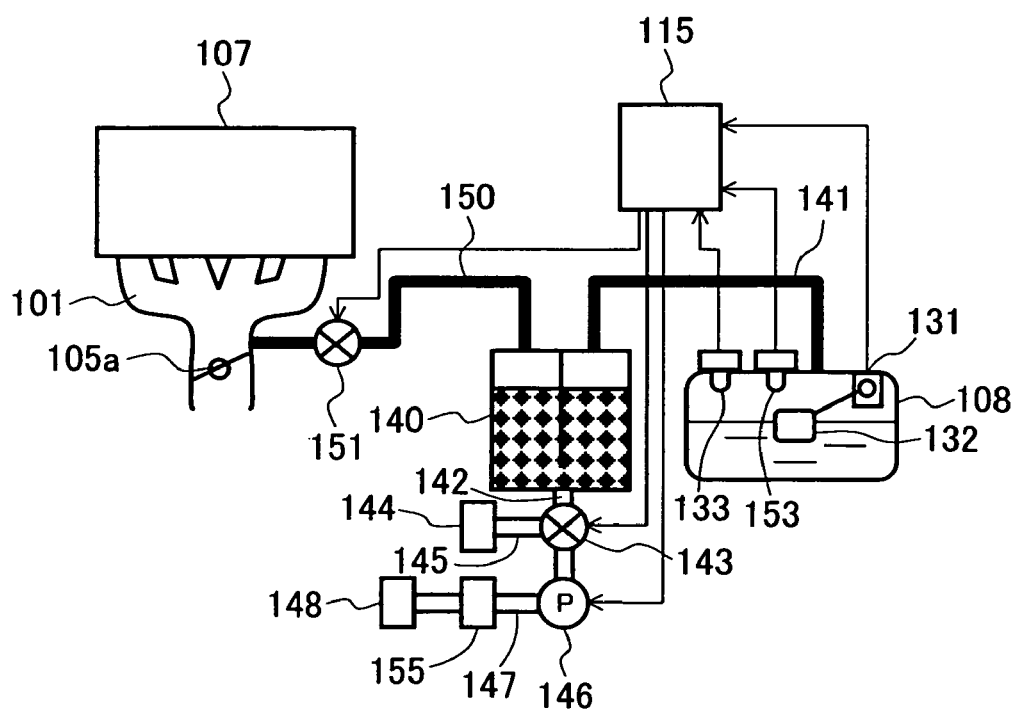
FIG. 2 is a schematic diagram of an evaporation purge system according to the present invention.

One embodiment of an evaporation purge system for a fuel supply device of an internal combustion engine according to the present invention will now be described with reference to FIG. 2.

The fuel tank 108 of the internal combustion engine 107 stores gasoline or other liquid hydrocarbon fuel. The fuel tank 108 is equipped with a liquid level sensor 131, which uses a float 132 or the like to measure the liquid level and determine the remaining fuel amount.

The liquid level sensor 131 converts a fuel liquid level to an electrical signal, which enters the control unit 115.

A pressure sensor 133 is mounted on the top of the fuel tank 108 to measure the pressure within the fuel tank 108. The pressure sensor 133 detects the pressure difference between the vapor section of the fuel tank 108 and the area outside the fuel tank (atmospheric pressure), converts the detected pressure difference to an electrical signal, and feeds the electrical signal to the control unit 115.

A tank temperature sensor 153 is also mounted on the top of the fuel tank 108 to detect the temperature of the vapor section in the tank (tank temperature). The tank temperature sensor 153 converts the temperature of the vapor section in the fuel tank 108 to an electrical signal and feeds the electrical signal to the control unit 115.

The evaporation purge system includes a canister 140, which houses activated carbon or other adsorbent that adsorbs and retains fuel vapor. A communicating tube 141 is connected between the canister 140 and the vapor section (top) of the fuel tank 108. Fuel vapor, which arises in the fuel tank 108 when the fuel in the fuel tank 108 evaporates, is introduced into the canister 140 via the communicating tube 141 and then adsorbed and retained by the canister 140.

The canister 140 is connected to the intake pipe 101 of the internal combustion engine 107 via a communicating tube 150. An electrically-driven purge control valve 151 is mounted in the middle of the communicating tube 150. An electrical signal output from the control unit 115 drives the purge control valve 151 and controls its opening.

The canister 140 includes an electromagnetically-driven drain path switching valve 143, which is provided for a drain port 142. The drain path switching valve 143 selectively connects the drain port 142 to an atmosphere port 145, which includes an air filter 144, or to an electric air pump 146. An atmosphere port 147 for the air pump 146 is provided with an air filter 148.

Under normal conditions, that is, while no evaporation leak diagnostic process is performed, the drain path switching valve 143 connects the drain port 142 to the atmosphere port 145 so that the drain port 142 is exposed to atmosphere. Therefore, while a vehicle operation is stopped, the drain path switching valve 143 exposes the drain port 142 to atmosphere and the purge control valve 151 closes and then the fuel evaporating from the fuel tank 108 is introduced into the canister 140 and adsorbed by the canister 140. Thus, the canister 140 prevents the fuel from being discharged into the atmosphere.

The internal combustion engine 107 generates a negative pressure in the intake pipe 101 within a low- to medium-load operating range. Therefore, when the opening of the purge control valve 151 is adjusted as specified with the drain path switching valve 143 connected to the atmosphere port 145 in such a state, outside air is introduced into the canister 140 via the atmosphere port 145. The vapor adsorbed by the canister 140 is then desorbed and introduced into the intake pipe 101. The introduced outside air and vapor are burned together with normal intake air and supplied fuel in the internal combustion engine 107.

If the amount of the outside air and vapor supplies from the canister 140 is not controlled, the supply air-fuel ratio for the internal combustion engine 107 is unexpectedly affected. Therefore, the opening of the purge control valve 151 is adjusted or eliminated in accordance with the operating status of the internal combustion engine 107 for the purpose of reducing the influence on the supply air-fuel ratio for the internal combustion engine 107.

The fuel evaporating while the internal combustion engine 107 is running will not be discharged into the atmosphere because it is also taken into the internal combustion engine 107 via the canister 140 as is the case with the outside air.

As is obvious from the above description, the mechanism described above operates to prevent fuel vapor from being discharged into the atmosphere. However, if, for instance, the fuel tank 108 or communicating tube 141 communicates with the atmosphere due to a leak, the mechanism may fail to work as described above. Under these circumstances, it is necessary to perform an evaporation leak diagnostic process for the purpose of detecting such a fault without delay.

When the drain path switching valve 143 connects the drain port 142 of the canister 140 to the air pump 146 at the time of an evaporation leak diagnosis, the air pump 146 can depressurize or pressurize the interior of the fuel tank 108 and the evaporation purge system containing the communicating tube 141 and canister 104 by discharging air out of or taking in air from the atmosphere port 147.

The employed structure is such that no air leaks from the air pump 146 to the air filter 148 while the pump is stopped. This structure can be implemented depending on the internal structure of the air pump 146 or by providing the atmosphere port 147 with a backflow prevention valve 155 based on a check valve or with an electromagnetic shutoff valve (not shown).

When the air pump 146 is operated by switching the drain path switching valve 143 to the air pump 146 and then stopped in a situation where the above structure is employed, the evaporation purge system including the fuel tank 108 can be isolated from the atmosphere. Consequently, if there is no leak, the pressure of the evaporation purge system can be maintained higher or lower than the atmospheric pressure.

A typical evaporation leak diagnostic process sequence that is followed by the above evaporation purge system will now be described with reference to FIG. 3. An evaporation leak diagnostic process is performed while the engine is stopped with the tank internal temperature lowered to the vicinity of an ambient temperature.

First of all, the purge control valve 151 closes. Then, the drain path switching valve 143 switches from the atmosphere port 145 (atmosphere side) to the air pump 146 (pump side) to drive the air pump 146 (time A). The air pump 146 then depressurizes the evaporation purge system to place it under negative pressure.

After the elapse of an adequate amount of time (at time B), the resulting pressure is used to check for a leak. If an abnormality exists when this judgment method is used, air flows inward from a leak hole. Therefore, the tank pressure P detected by the pressure sensor 133 is a small negative pressure (equal to a relative pressure of −2 to −3 kPa). If, on the other hand, there is no abnormality, the tank pressure P detected by the pressure sensor 133 is an extremely great negative. (However, the tank pressure P is equal to a relative pressure of approximately −5 kPa because the fuel tank 108 is usually provided with a relief valve, which is not shown.)

In other words, this diagnostic process sequence ignores transient tank pressure changes that may occur depending on the amount of fuel remaining in the fuel tank 108, operates the air pump 146 for a long period of time (5 to 10 minutes), and checks for a leak in accordance with the tank pressure prevailing when the pressure of the evaporation purge system is virtually stabilized (at time B).

However, the inventors of the present invention found that there are some problems with the above diagnostic process sequence. One problem is a battery for driving the air pump 146. More specifically, a weak battery cannot generate adequate power for startup and may become exhausted because the pump is driven for a long period of time while the vehicle is stopped with the engine stopped.

Another problem is vapor emission out of the vehicle. More specifically, if the air pump 146 is driven for a long period of time, the vapor adsorbed by the canister 140 may be discharged out of the vehicle.

Still another problem is that a long drive of the air pump 146 may increase the possibility of allowing the internal combustion engine 107 to start up during the pump drive and being compelled to abort an evaporation diagnostic process, thereby decreasing the diagnosis frequency. Further, when the fuel tank 108 is pressurized or placed under negative pressure for a long period of time, it deforms. Such fuel tank deformation may accelerate the deterioration of the fuel tank 108.

All the above problems occur because the air pump 146 is driven for a long period of time. Under these circumstances, the inventors of the present invention have devised a method that solves the above problems and makes it possible to properly perform an evaporation leak diagnostic process even when the pump is driven for a short period of time.

The evaporation leak diagnostic process according to one embodiment of the present invention will now be described with reference to FIGS. 2 and 4.

The control unit 115 is based on a microcomputer. It opens/closes the purge control valve 151, operates the drain path switching valve 143, controls the drive for the air pump 146, and functions as leak judgment means.

The purge control valve 151 and drain path switching valve 143 compose shutout means for shutting out the evaporation purge system from atmospheric air.

While the internal combustion engine 107 is stopped, the control unit 115 closes the purge control valve 151, switches the drain path switching valve 143 to the pump side, drives the air pump 146 with the evaporation purge system shut out from atmospheric air, stops the air pump 146 when the tank pressure P detected by the pressure sensor 133 reaches a predetermined pressure Pa, and formulates a leak judgment in accordance with the drive time T for the air pump 146 and a pressure change K after pump stoppage.

In the above leak judgment sequence, the control unit 115 judges that there is a leak (formulates an abnormality judgment) only when the drive time T for the air pump 146 is greater than a threshold value for the pump drive time and the pressure change K after pump stoppage is greater than a threshold pressure change. Under the other conditions, the control unit 115 judges that there is no leak (formulates a normality judgment).

Next, the above leak judgment sequence will be described with reference to a timing diagram in FIG. 4.

First of all, the purge control valve 151 closes. Then, the drain path switching valve 143 switches from the atmosphere port 145 (atmosphere side) to the air pump 146 (pump side) to drive the air pump 146 (time A). The air pump 146 stops when the tank pressure P detected by the pressure sensor 133 is lowered to the predetermined pressure (negative pressure) Pa (at time between Ba and Bb). Then, changes in the tank pressure P detected by the pressure sensor 133 are monitored during an interval between air pump stoppage and time C.

In the above instance, the time interval between time A and the instant at which the tank pressure P reaches the predetermined pressure Pa (this time interval is referred to as the pump drive time T) and the pressure change gradient prevailing after the stop of the air pump 146 (this gradient is referred to as the leak-down change value K) are detected. These two parameters are used to check for an evaporation purge system abnormality.

Subsequently, the former (the judgment of the pump drive time T) may be referred to as a pull-down diagnosis, and the latter (the judgment of the leak-down change value K) may be referred to as a leak-down diagnosis.

When the evaporation purge system is abnormal, the pump drive time Tb is longer than the value Ta, which prevails while no abnormality exists, and the pressure change gradient (leak-down change value K) prevailing after pump stoppage increases.

In the present embodiment, the pump drive time T can be reduced to approximately 1 to 2 minutes, and the time required after pump stoppage is approximately 2 minutes. Therefore, the diagnosis time can be reduced to solve all the problems indicated in FIG. 3.

Figure 5:
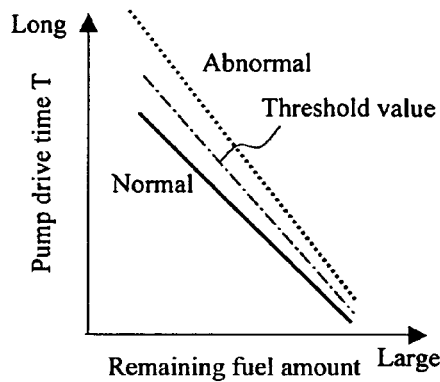
FIGS. 5A and 5B are graphs illustrating the diagnostic threshold value characteristic according to one embodiment of the present invention.
Figure 5:
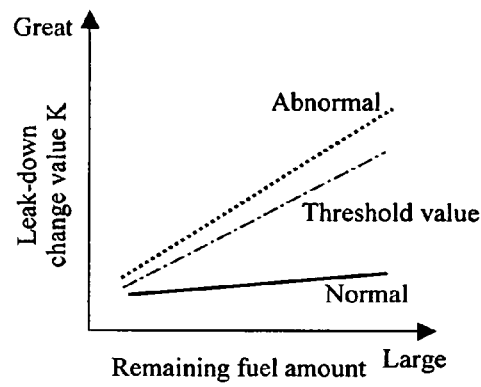

The pump drive time T and leak-down change value K depend on the remaining fuel amount, which is indicated by a signal that is output from the liquid level sensor 131. As indicated in FIGS. 5A and 5B, the pump drive time T decreases with an increase in the remaining fuel amount. On the contrary, the leak-down change value K increases with an increase in the remaining fuel amount.

Therefore, the leak judgment threshold values should be set in accordance with the remaining fuel amount as indicated in FIGS. 5A and 5B. More specifically, the abnormality judgment threshold value for the pump drive time T should decrease with an increase in the remaining fuel amount, whereas the abnormality judgment threshold value for the leak-down change value K should increase with an increase in the remaining fuel amount.

The diagnostic process sequence described above is characterized by the fact that the pump drive time and leak-down change value are both used for judgment purposes. For example, an abnormality judgment is formulated only when the threshold values for the pump drive time T and leak-down change value K, which are indicated in FIGS. 5A and 5B, are both exceeded.

In other words, an abnormality judgment is formulated only when the leak judgment threshold value for the pump drive time is exceeded by the pump drive time T and the leak judgment threshold value for the leak-down change value is exceeded by the leak-down change value K. An abnormality judgment is not formulated if both of these two conditions are not met. This provides increased diagnosis accuracy.

The reason for diagnosis accuracy increase will be explained with reference to FIGS. 6 and 7.

Figure 6:
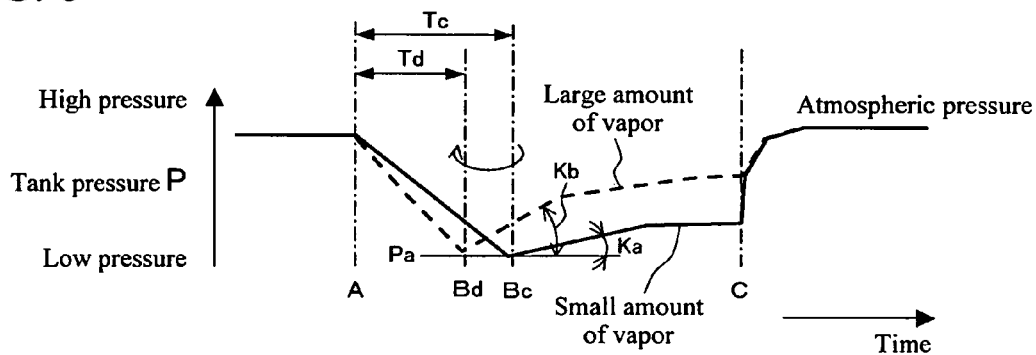
FIG. 6 is a timing diagram illustrating the influence of evaporation that is invoked when there is no leak in one embodiment of the present invention.

FIG. 6 illustrates the influence of evaporation, which may cause a diagnosis error when there is no leak. As indicated in FIG. 6, when the amount of vapor generation is large, the evaporation pressure increases the leak-down change value K from Ka to Kb as compared to a case where the amount of vapor generation is small. Therefore, if only the leak-down change value K is observed, an erroneous judgment may be formulated to conclude that there is a leak.

However, when the amount of vapor generation is large, the canister 140 adsorbs the vapor. Therefore, the time at which the tank pressure P decreases to the predetermined pressure Pa after pump drive start time A changes to time Bd. Time Bd is earlier than time Bc, which is for a case where the amount of vapor generation is small. Thus, the pump drive time T is shorter when the vapor generation amount is large than when the vapor generation amount is small (Tc->Td). Consequently, no abnormality is indicated by the pump drive time T.

As a result, when an abnormality is checked for in accordance with both the pump drive time T and leak-down change value K, an accurate diagnosis can be made without making an erroneous one even if the vapor generation amount is large.

Figure 7:
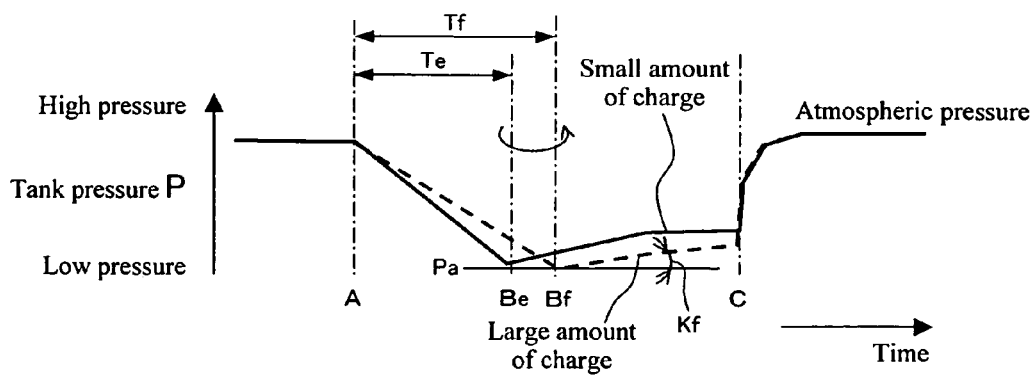
FIG. 7 is a timing diagram illustrating the influence of a canister charge amount that is invoked when there is no leak in one embodiment of the present invention.

FIG. 7 illustrates the influence of the amount of vapor adsorption by the canister 140 (charge amount), which may cause a diagnosis error when there is no leak. As indicated in FIG. 7, when the charge amount of the canister 140 is large, the pressure loss of the canister 140 increases. Therefore, the time at which the tank pressure P decreases to the predetermined pressure Pa changes to time Bf. Time Bf is later than time Bd, which is for a case where the charge amount is small. Thus, the pump drive time T increases from Td to Tf. Consequently, an erroneous judgment may be formulated to conclude that there is a leak.

However, the leak-down change value does not indicate a leak. Thus, the leak-down change value K is Kf and small.

As a result, when an abnormality is checked for in accordance with both the pump drive time T and leak-down change value K, an accurate diagnosis can be made without making an erroneous one even if the charge amount is large.

If there is a large leak hole, the tank internal pressure may not decrease to the predetermined pressure Pa. In such a situation, only a pull-down diagnosis will suffice to determine whether a pump failure or large leak is encountered. If, in this instance, a certain negative pressure is generated although the predetermined pressure Pa is not reached, a subsequent leak-down diagnosis makes it possible to determine whether a pump failure or large leak is encountered. More specifically, when the pressure change occurring at the time of leak-down is greater than a predetermined value, there is a large leak. If not, the pump is faulty.

If the tank pressure changes as indicated in FIG. 7, the charge amount increases with an increase in the pump drive time. Therefore, the charge amount of the canister 140 can be estimated from the pump drive time T such as the pump drive time values Te and Tf.

As a result, purge control can be exercised with the estimated charge amount of the canister 140 taken into consideration. Thus, the exhaust performance can be further improved.

Another factor for incurring tank pressure changes shown in FIG. 7 is pump performance deterioration. In this case, too, the pump drive time T increases. However, the leak-down change value K prevailing after pump stoppage is small. Therefore, an abnormality judgment will not be erroneously formulated.

In a situation to which the present invention is applied, an abnormality judgment is not formulated even if a leak valve, which is intentionally provided for the evaporation purge system, is opened to incur leakage during pull-down only or during leak-down only.

If, while the pump is driven or stopped with the evaporation purge system closed, it is not judged that there is a leak, a diagnosis is made to conclude that no abnormality exists. In this manner, an abnormality judgment is properly formulated.

An abnormality detection can be confirmed by referencing a specific system-owned memory or by checking whether a warning lamp (MIL) is illuminated.

Another embodiment of an evaporation leak diagnostic process according to the present invention will now be described with reference to FIG. 8. This embodiment differs from the previous embodiment (FIG. 4) in that the air pump 146 pressurizes the evaporation purge system, which includes the fuel tank 108, to a predetermined pressure level (positive pressure) Pb during an evaporation leak diagnostic process.

In the case of pressurization, the resulting pressure changes represent the reversal of pressure changes caused by depressurization. However, these two types of pressure changes are equal to each other in basic properties. If an abnormality exists in the case of pressurization, the pump drive time T increases from Ta to Tb and the pressure gradient (leak-down change value K) prevailing after pump stoppage increases.

When the air pump 146 pressurizes the evaporation purge system, the vapor is less likely to leak out of the canister 140 than in the case of depressurization. The reason is that outside air is forced into the canister 140 for diagnostic purposes.

Figure 9:
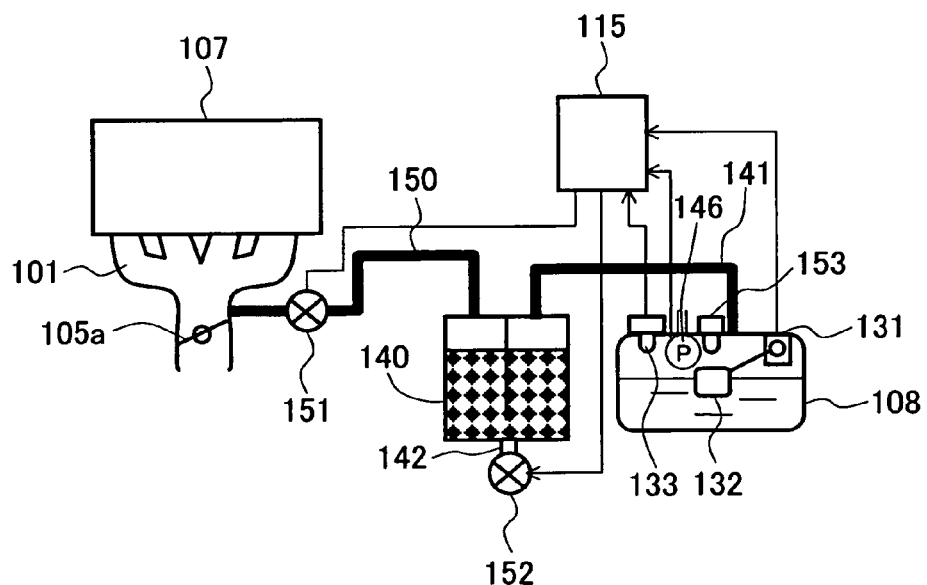
FIG. 9 is a schematic diagram illustrating another configuration of an evaporation purge system according to another embodiment of the present invention.

As regards pressurization, the air pump 146 need not be positioned in a drain section of the canister 140. For example, the air pump 146 may be mounted on the top of the fuel tank 108 as indicated in FIG. 9. In this case, the drain port 142 of the canister 140 should be provided with an electromagnetic drain control valve 152, which opens and closes the drain port 142. As is the case with the previous embodiment, the present embodiment is configured so that no air flows from the air pump 146 to the atmosphere while the pump is stopped.

Figure 10:
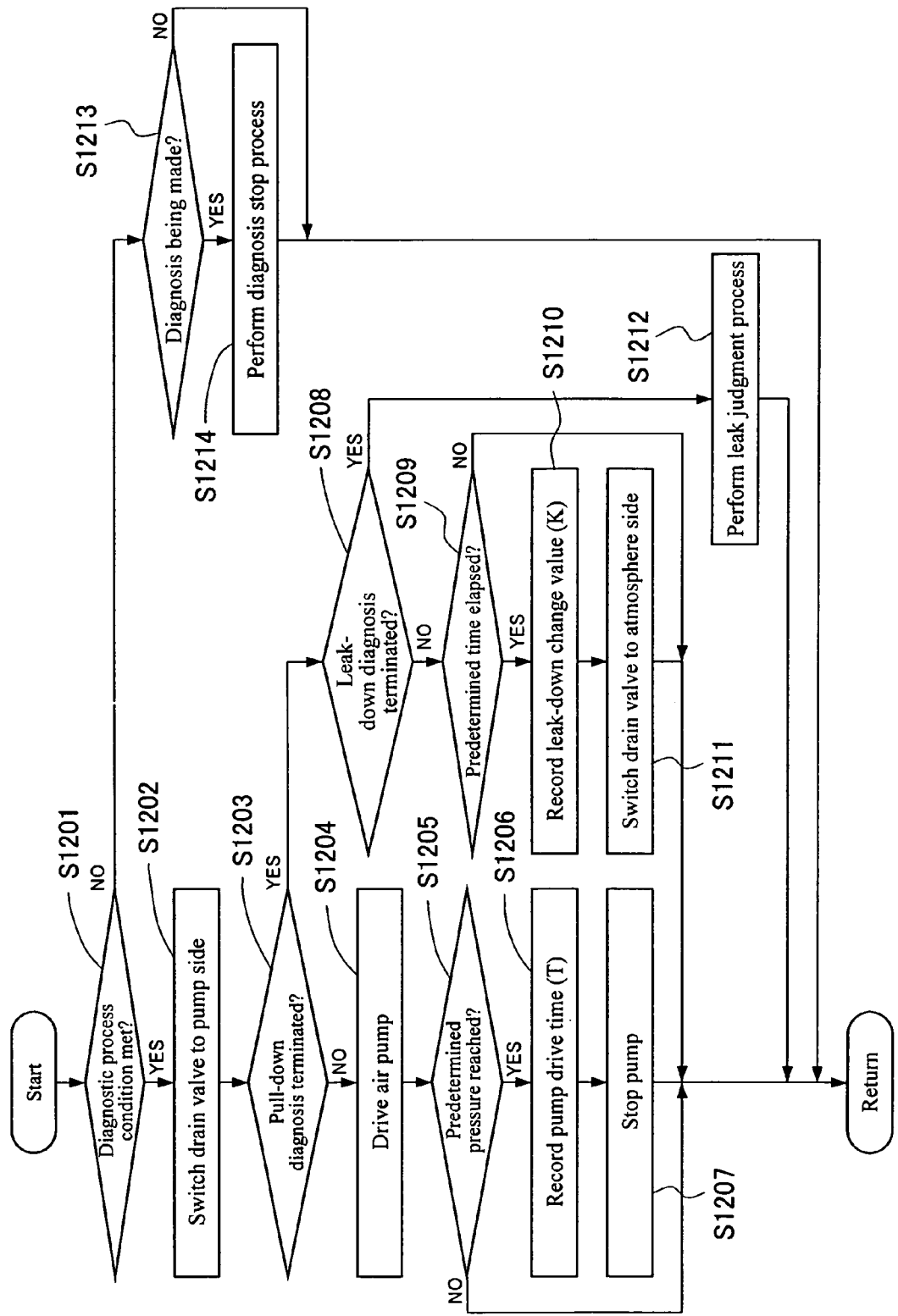
FIG. 10 is a flowchart illustrating processing steps performed by a program that implements one embodiment of an evaporation leak diagnostic process according to the present invention.

The processing steps performed by a program for implementing the embodiments (FIGS. 4 and 8) of an evaporation leak diagnostic process according to the present invention will now be described with reference to FIG. 10. The program is executed, for instance, at intervals of 100 ms.

Step S1201 is performed to judge whether a diagnostic process condition is met. If the condition is met, the flow proceeds to step S1202. If the condition is not met, the flow proceeds to step S1213.

The condition is met if at least one of a plurality of conditions is met. More specifically, the condition is met if the engine is stopped, the evaporation leak diagnostic process is not terminated (the leak judgment process result is not recorded in a predetermined memory), the elapsed time after engine stoppage is greater than a predetermined value (e.g., 5 hours), the tank temperature is lower than a predetermined level (e.g., atmospheric air temperature +5° C.), or the canister charge amount is smaller than a predetermined value (e.g., the traveling cumulative purge time is greater than a predetermined value).

If the tank temperature sensor 153 is not furnished, an alternative is to estimate the tank temperature from the value of the water temperature sensor 123 or an outside air temperature sensor (not shown).

In step S1202, the drain path switching valve (drain valve) 143 switches from the atmosphere side to the pump side.

Step S1203 is performed to judge whether a pull-down diagnosis is terminated. If the pull-down diagnosis is terminated, the flow proceeds to step S1208. If the pull-down diagnosis is not terminated, the flow proceeds to step S1204.

In the pull-down diagnosis, an abnormality judgment is formulated in accordance with the pump drive time T that is required for the tank pressure P to reach the predetermined pressure Pa (e.g., relative pressure −2 kPa or so). Therefore, whether or not the diagnosis is terminated can be determined by checking whether the pump drive time T is recorded in the predetermined memory.

In step S1204, the air pump 146 is driven because the pull-down diagnosis is not terminated.

Step S1205 is performed to judge whether the predetermined pressure Pa is reached by the tank pressure P. If the predetermined pressure Pa is reached by the tank pressure P, the flow proceeds to step S1206. If not, the process terminates without performing the subsequent steps.

In step S1206, the pump drive time T is recorded in the predetermined memory. After completion of this step, the flow proceeds to step S1207.

In step S1207, the air pump 146 stops to terminate the pull-down diagnosis.

As a result, next time the program is executed, the flow skips from step S1203 to step S1208 and makes a leak-down diagnosis.

Step S1208 is performed to judge whether or not the leak-down diagnosis is terminated. If the leak-down diagnosis is terminated, the flow proceeds to step S1212. If not, the flow proceeds to step S1209.

In the leak-down diagnosis, an abnormality judgment is formulated in accordance with the tank pressure change (leak-down change value K) prevailing after the elapse of a predetermined period of time since pump stoppage. Therefore, whether or not the diagnosis is terminated can be determined by checking whether the leak-down change value K is recorded in the predetermined memory.

Step S1209 is performed to judge whether or not a predetermined of time has elapsed since the stoppage of the air pump 146. If the predetermined of time has elapsed since the stoppage of the air pump 146, the flow proceeds to step S1210. If not, no subsequent processing steps are performed.

In step S1210, the leak-down change value K is recorded in the predetermined memory. After completion of this step, the flow proceeds to step S1211. In step S1211, the drain path switching valve (drain valve) 143 switches from the pump side to the atmosphere side.

After steps S1203 and S1208 are completed to judge that both diagnoses are terminated, the flow proceeds to step S1212. In step S1212, a leak judgment process is performed.

Only when the pump drive time T is longer than the predetermined period of time and the leak-down change value K is greater than the predetermined value, the leak judgment process concludes that there is a leak in the evaporation purge system, illuminates the abnormality warning lamp (MIL), and records the obtained result in the memory.

The MIL does not have to illuminate after a single diagnosis result is obtained. An alternative is to record the previous diagnosis result in the memory, and illuminate the MIL when an abnormality is detected two times in succession.

Step S1213 is provided for a case where the engine starts up during a diagnosis. If the drain path switching valve 143 switches to the pump side in step S1213, it can be judged that a diagnosis is being made.

If it is judged in step S1213 that a diagnosis is being made, the flow proceeds to step S1214. Step S1214 is performed to stop the diagnosis. More specifically, step S1214 is performed to stop the air pump 146, switch the drain path switching valve 143 from the pump side to the atmosphere side, and clear the pump drive time T and leak-down change value from the memory.

Figure 11:
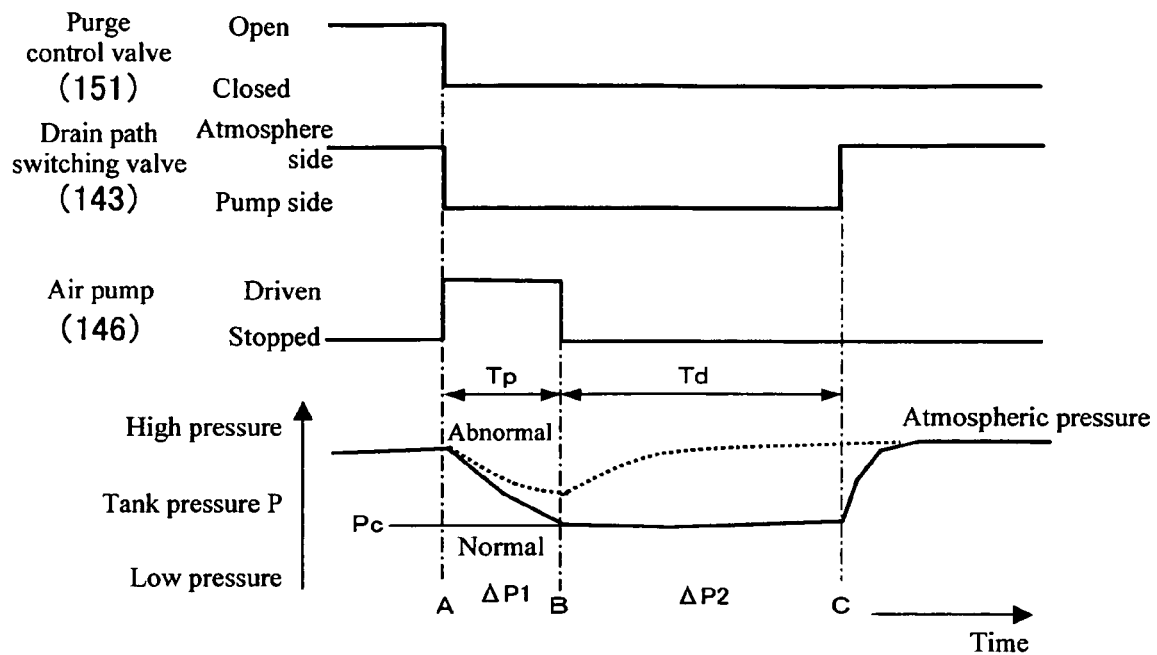
FIG. 11 is a timing diagram illustrating another embodiment of an evaporation leak diagnostic process according to the present invention.

Another embodiment of an evaporation leak diagnostic process according to the present invention will now be described with reference to FIGS. 4 and 11.

In this embodiment, too, the control unit 115 functions as the leak judgment means, closes the purge control valve 151 while the internal combustion engine 107 is stopped, switches the drain path switching valve 143 to the pump side, drives the air pump 146 for a predetermined period of time Tp with the evaporation purge system isolated from the atmosphere, and formulates a leak judgment in accordance with the amount of pressure change ΔP1 in the tank pressure P that is detected by the pressure sensor 133 while the pump is driven for the predetermined period of time Tp and the amount of pressure change ΔP2 that is detected during a predetermined period of time Td after pump stoppage.

In the above leak judgment sequence, it is judged that there is a leak (an abnormality judgment is formulated) only when the amount of pressure change ΔP1 during pump drive is greater than a threshold pressure change during the pump drive and the amount of pressure change ΔP2 during the predetermined period of time after pump stoppage is greater than a threshold pressure change after pump stoppage. Under the other conditions, it is judged that there is no leak (a normality judgment is formulated).

In the present embodiment, if there is no leak in the evaporation purge system, the leak judgment is formulated in accordance with the time required for the tank pressure P to reach a predetermined pressure Pc (e.g., −2 kPa) after air pump drive time A, that is, the amount of change ΔP1 in the tank pressure P prevailing at time B, which comes when predefined pump drive time Tp elapses after the air pump drive time A.

Figure 12:
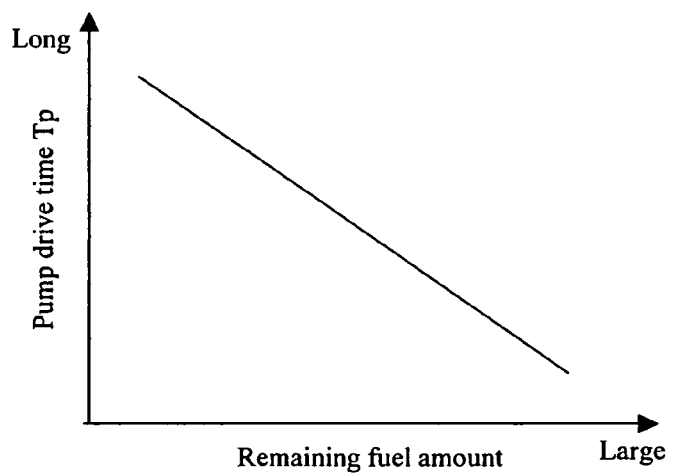
FIG. 12 is a graph illustrating the relationship between pump drive time and remaining fuel amount in another embodiment of the present invention.

Since the time required for depressurization decreases with a decrease in the spatial volume, the pump drive time setting Tp should decrease with an increase in the amount of fuel remaining in the fuel tank 108 as indicated in FIG. 12.

When the pump drive time Tp is set as described above so that the tank pressure P reaches the predetermined pressure Pc in a situation where there is no leak, the pump drive time Tp can be shorter than in the case of a pull-down diagnosis according to the previous embodiment. This is one of the advantages that are provided by the present embodiment.

The pump drive time Tp, which is required for the tank pressure P to reach the predetermined pressure Pc, is affected by the charge amount of the canister 140 and the amount of vapor generation in the fuel tank 140.

Figure 13:
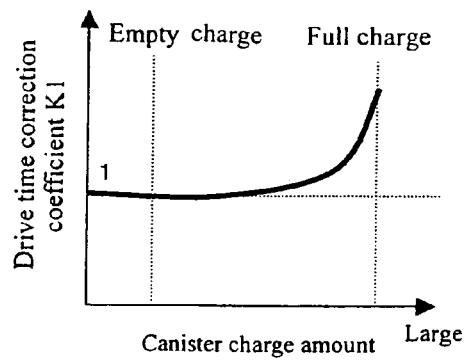
FIGS. 13A and 13B are graphs illustrating a correction coefficient characteristic of pump drive time in another embodiment of the present invention.
Figure 13:
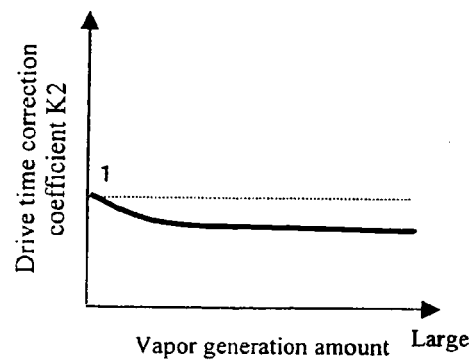

Under these circumstances, drive time correction coefficients K1 and K2, which are shown in FIGS. 13A and 13B, may be adopted to correct the pump drive time Tp in a manner indicated by the following equation:

Pump drive time $Tp \leftarrow Tp(K1 \times K2)$

FIG. 13A shows the relationship between the canister charge amount and drive time correction coefficient K1. The pressure loss of the canister 140 increases with an increase in the charge amount of the canister 140. Drive time correction coefficient K1 corrects such a pressure loss increase. Drive time correction coefficient K1 should increase with an increase in the canister charge amount.

The term "full charge" in FIG. 13A represents a vapor adsorption limit of the canister 140. The term "empty charge" represents a state where purge control is exercised to provide a predefined purge (e.g., a flow volume of 200 liters).

FIG. 13B shows the relationship between the vapor generation amount and drive time correction coefficient K2. Depressurization occurs when the canister 140 adsorbs the vapor generated in the tank. Drive time correction coefficient K2 corrects the influence of such depressurization. Drive time correction coefficient K2 should decrease with an increase in the vapor generation amount.

Figure 14:
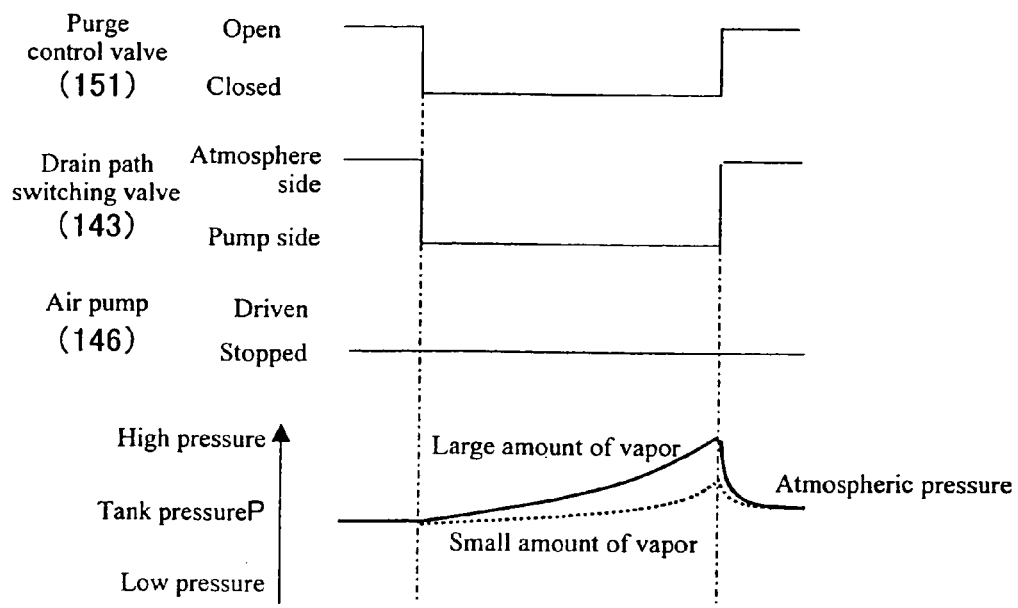
FIG. 14 is a timing diagram illustrating one embodiment of a vapor generation amount estimation process according to the present invention.

A typical vapor generation amount estimation method will now be described with reference to FIG. 14.

The purge control valve 151 closes and the drain path switching valve 143 switches to the pump side. The evaporation purge system then closes. In the resulting state, changes in the tank pressure P are measured.

If, in the above instance, the vapor generation amount is large, the tank pressure P greatly increases. If, on the other hand, the vapor generation amount is small, the resulting tank pressure changes are small. Therefore, the aforementioned vapor generation amount estimation procedure may be performed before diagnosis sequence execution to estimate the vapor generation amount. Then, drive time correction coefficient K2 may be set to correct the pump drive time Tp.

It is possible to avoid a diagnosis error due to a large vapor generation amount by closing the purge control valve 151, switching the drain path switching valve 143 to the pump side, and disabling the diagnosis (leak judgment) function if a tank pressure change exceeds a predetermined value while the evaporation purge system is closed. This leak judgment function disabling process can also be applied to the embodiments indicated in FIGS. 4 and 8.

Figure 15:
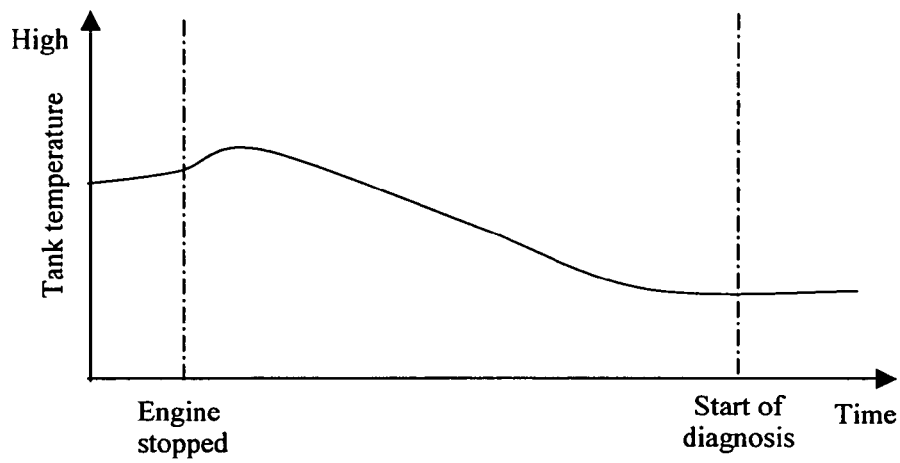
FIGS. 15A, 15B, and 15C are timing diagrams illustrating the relationship between a tank temperature history and diagnosis start timing.
Figure 15:
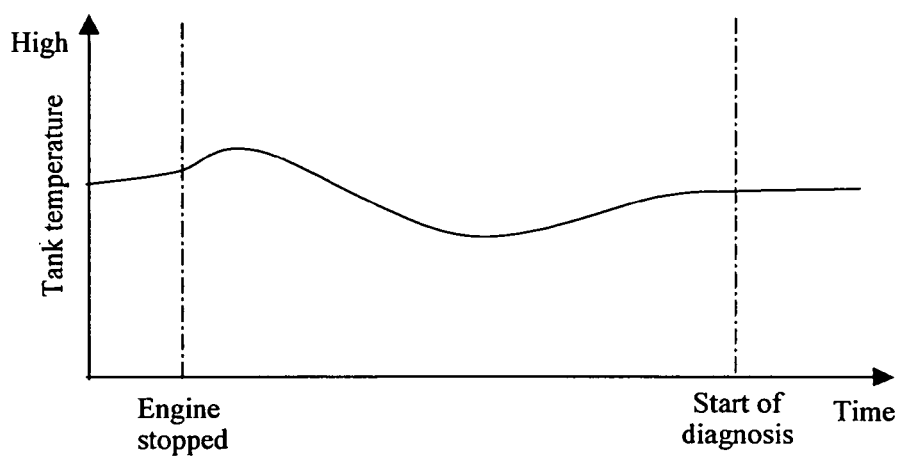
Figure 15:
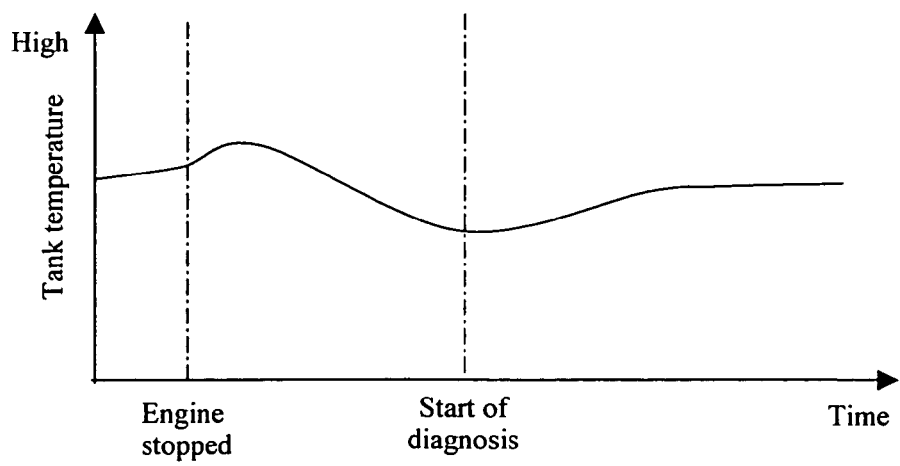

FIGS. 15A, 15B, and 15C illustrate temperature changes (tank temperature history) in the fuel tank 108, which are detected by the tank temperature sensor 153 after engine stoppage. The vapor generation amount and canister charge amount can be estimated by using the tank temperature history and the vapor generation amount estimation method described above.

FIG. 15A illustrates a case where an evaporation purge diagnosis was made after the temperature in the fuel tank 108 rose subsequently to engine stoppage and then lowered to the ambient temperature.

In the above example, the tank temperature is measured immediately after engine stoppage. Further, the vapor generation amount is estimated by the vapor generation amount estimation method described above.

Subsequently, the tank temperature is sampled at fixed time intervals (e.g., at intervals of 30 minutes) to estimate the vapor generation amount. The canister adsorption amount can then be estimated from the cumulative estimated vapor amount and cumulative purge flow rate.

If vapor estimation is performed only immediately after engine stoppage and then only a temperature profile is acquired, the vapor generation amount can be estimated. The main reason is that vapor is generated only while the tank temperature is rising. Therefore, when the temperature profiles in FIGS. 15A and 15B are compared, the comparison result indicates that the cumulative tank temperature rise time is longer in FIG. 15B than in FIG. 15A. It means that the vapor generation amount is larger in FIG. 15B than in FIG. 15A. Accordingly, the canister charge amount is larger in FIG. 15B than in FIG. 15A.

Further, when the present diagnosis sequence is used, an erroneous diagnosis may result if the canister charge amount and vapor generation amount are both large. Therefore, the diagnosis start time need not be fixed as specified as indicated in FIGS. 15A and 15B. Instead, an evaporation leak diagnostic process may be performed as indicated in FIG. 15C while the temperature profile is steady with the vapor generation amount reduced.

When the canister charge amount is close to full charge and the remaining fuel amount is small depending on the temperature profile and vapor estimation method, the vapor may be discharged into the atmosphere during a pump operation. Therefore, it is preferred that the evaporation leak diagnosis function be disabled. This leak judgment function disabling process can also be applied to the embodiments indicated in FIGS. 4 and 8.

In the evaporation leak diagnostic process according to the present invention, an abnormality judgment can be formulated using both the pull-down change amount ΔP1 and leak-down change amount ΔP2. The pull-down change amount ΔP1 is the amount of tank pressure change that is encountered during the pump drive time Tp while the pump is driven (from time A to time B). The leak-down change amount ΔP2 is the amount of tank pressure change that is encountered during the post-pump-stoppage time Td after pump stoppage (from time B to time C).

Figure 16:
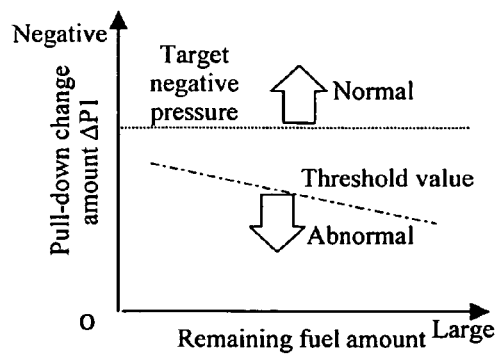
FIGS. 16A and 16B are graphs illustrating a diagnostic threshold value characteristic according to another embodiment of the present invention.
Figure 16:
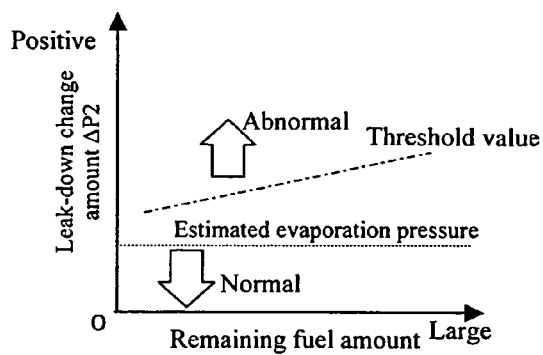

First of all, an abnormality judgment based on the pull-down change amount ΔP1 will be described. As indicated in FIG. 16A, when no abnormality exists (there is no leak), the pull-down change amount ΔP1 is large so that the target negative pressure is reached. On the other hand, if an abnormality exists, the pull-down change amount ΔP1 is small so that the target negative pressure is not reached by means of depressurization.

Therefore, if the pull-down change amount ΔP1 is smaller than a threshold value based on the remaining fuel amount in a situation where the judgment to be formulated is based on the pull-down change amount ΔP1, it is judged that an abnormality exists.

The threshold value approaches zero when the remaining fuel amount increases. The reason is that the pump drive time decreases with an increase in the remaining fuel amount, thereby reducing the pressure difference between normality and abnormality.

Next, an abnormality judgment based on the leak-down change amount ΔP2 will be described. As indicated in FIG. 16B, when no abnormality exists, the leak-down change amount ΔP2 is smaller than the estimated evaporation pressure. On the other hand, if an abnormality exists, the leak-down change amount ΔP2 is far larger than the estimated evaporation pressure because air flows inward from a leak hole.

The threshold value increases with an increase in the remaining fuel amount. The reason is that the spatial volume decreases with an increase in the remaining fuel amount, thereby increasing the influence of leakage.

Another embodiment of an evaporation leak diagnostic process according to the present invention will now be described with reference to FIG. 17. This embodiment differs from the previous embodiment (FIG. 11) in that the air pump 146 pressurizes the evaporation purge system, which includes the fuel tank 108, during an evaporation leak diagnostic process.

In the case of pressurization, the resulting pressure changes represent the reversal of pressure changes caused by depressurization. However, these two types of pressure changes are equal to each other in basic properties. In the case of pressurization, therefore, the diagnostic process can be performed in the same manner as in the case of depressurization. Further, when the air pump 146 pressurizes the evaporation purge system, the vapor is less likely to leak out of the canister than in the case of depressurization.

Figure 8:
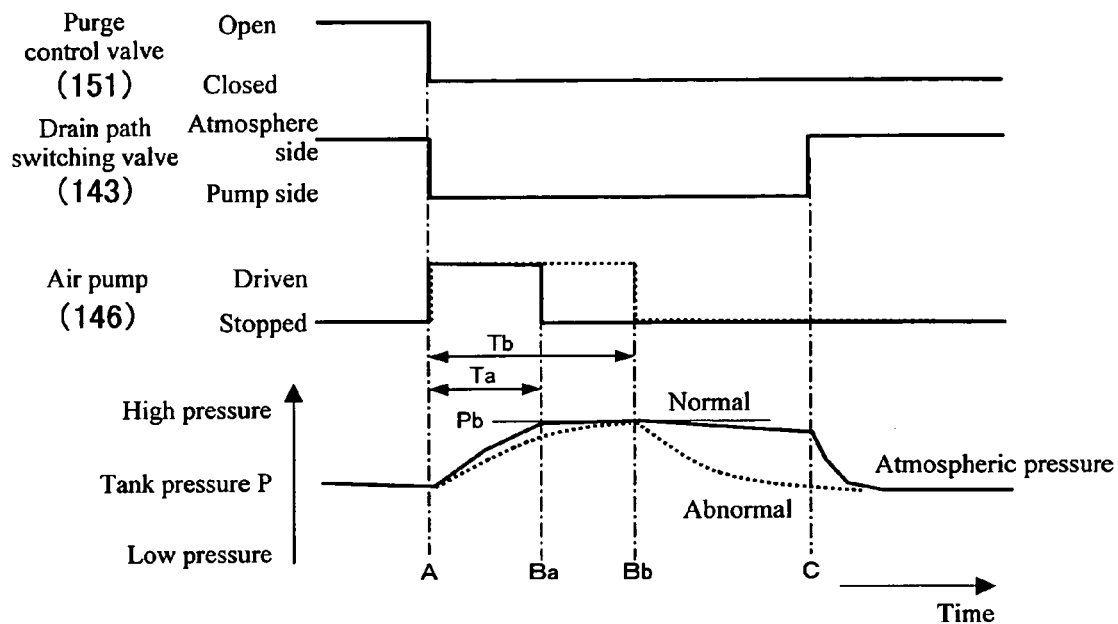
FIG. 8 is a timing diagram illustrating another embodiment of an evaporation leak diagnostic process according to the present invention.
Figure 17:
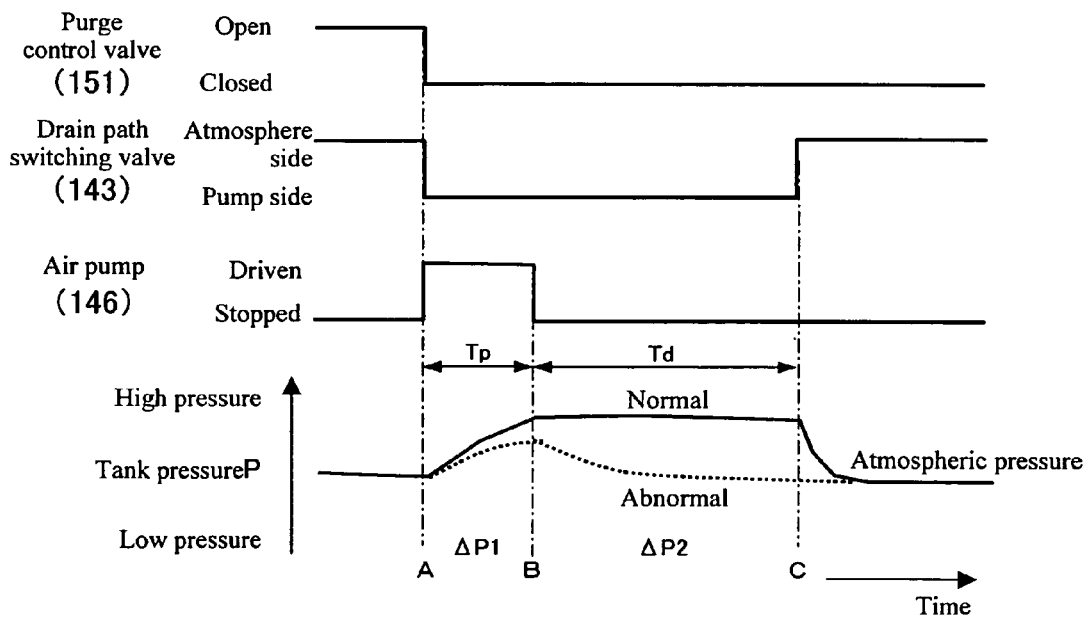
FIG. 17 is a timing diagram illustrating another embodiment of an evaporation leak diagnostic process according to the present invention.

The embodiments indicated in FIGS. 8 and 17 assume that the entire amount of pressure change between time A and time B is the pull-down change amount ΔP1, and that the entire amount of pressure change between time B and time C is the leak-down change amount ΔP2. Alternatively, however, the pull-down change amount ΔP1 may relate to a pressure change within an arbitrary period between time A and time B, and the leak-down change amount ΔP2 may relate to a pressure change within an arbitrary period between time B and time C.

Figure 18:
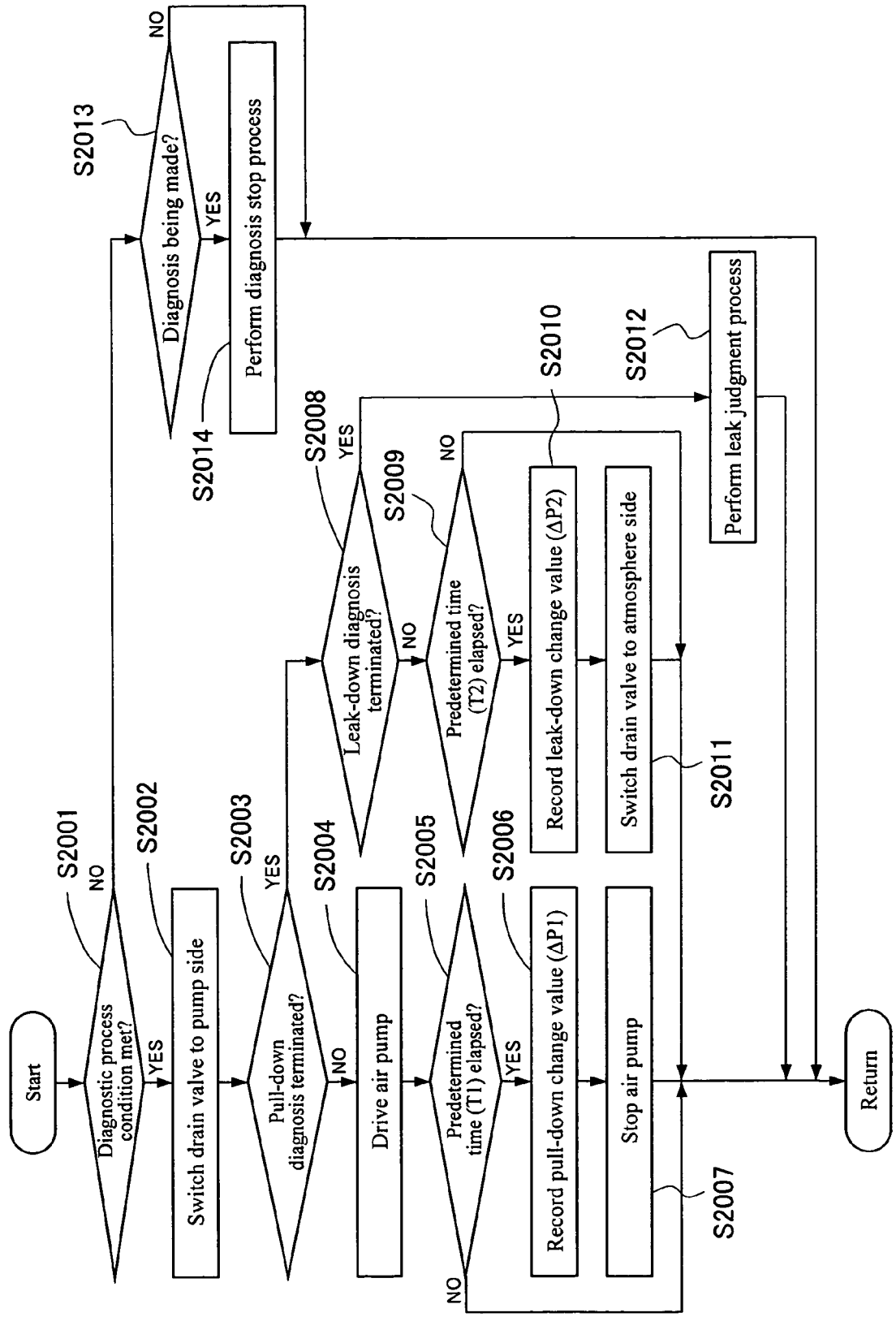
FIG. 18 is a flowchart illustrating processing steps performed by a program that implements another embodiment of an evaporation leak diagnostic process according to the present invention.

The processing steps performed by a program for implementing the embodiments (FIGS. 11 and 17) of an evaporation leak diagnostic process according to the present invention will now be described with reference to FIG. 18. The program is executed, for instance, at intervals of 100 ms.

Step S2001 is performed to judge whether or not a diagnostic process condition is met. If the condition is met, the flow proceeds to step S2002. If the condition is not met, the flow proceeds to step S2013.

The condition is met if at least one of a plurality of conditions is met. More specifically, the condition is met if the engine is stopped, the evaporation leak diagnostic process is not terminated (the leak judgment process result is not recorded in a predetermined memory), the elapsed time after engine stoppage is greater than a predetermined value (e.g., 5 hours), the tank temperature is lower than a predetermined level (e.g., atmospheric air temperature +5° C.), or the canister charge amount is smaller than a predetermined value (e.g., the traveling cumulative purge time is greater than a predetermined value).

In step S2002, the drain path switching valve 143 switches from the atmosphere side to the pump side.

Step S2003 is performed to judge whether or not a pull-down diagnosis is terminated. If the pull-down diagnosis is terminated, the flow proceeds to step S2008. If the pull-down diagnosis is not terminated, the flow proceeds to step S2004.

In the pull-down diagnosis according to the present embodiment, the air pump 146 is driven for the predetermined period of time Tp that is required for the tank pressure P to reach the predetermined pressure Pc (e.g., relative pressure −2 kPa or so) while there is no leak. An abnormality judgment is then formulated in accordance with the resulting actual pull-down change amount ΔP1. Therefore, whether or not the diagnosis is terminated can be determined by checking whether or not the pull-down change amount ΔP1 is recorded in the predetermined memory.

In step S2004, the air pump 146 is driven because the pull-down diagnosis is not terminated.

Step S2005 is performed to judge whether the predetermined period of time Tp is reached by the pump drive time. If the predetermined period of time Tp is reached by the pump drive time, the flow proceeds to step S2006. If not, the process terminates without performing the subsequent steps.

In step S2006, the pull-down change amount ΔP1 is recorded in the predetermined memory. After completion of this step, the flow proceeds to step S2007.

In step S2007, the air pump 146 stops to terminate the pull-down diagnosis.

As a result, next time the program is executed, the flow skips from step S2003 to step S2008 and makes a leak-down diagnosis.

Step S2008 is performed to judge whether the leak-down diagnosis is terminated. If the leak-down diagnosis is terminated, the flow proceeds to step S2012. If not, the flow proceeds to step S2009.

In the leak-down diagnosis, an abnormality judgment is formulated in accordance with the leak-down change amount ΔP2 prevailing after the elapse of predetermined post-pump-stoppage time Td since pump stoppage. Therefore, whether the diagnosis is terminated can be determined by checking whether the leak-down change amount ΔP2 is recorded in the predetermined memory.

Step S2009 is performed to judge whether or not the post-pump-stoppage time Td has elapsed since the stoppage of the air pump 146. If the post-pump-stoppage time Td has elapsed since the stoppage of the air pump 146, the flow proceeds to step S2010. If not, no subsequent processing steps are performed.

In step S2010, the leak-down change amount ΔP2 is recorded in the predetermined memory. After completion of this step, the flow proceeds to step S2011. In step S2011, the drain path switching valve 143 switches from the pump side to the atmosphere side.

After steps S2003 and S2008 are completed to judge that the diagnoses are terminated, the flow proceeds to step S2012. In step S2012, a leak judgment process is performed.

Only when the pull-down change value ΔP1 is smaller than a predetermined value that is smaller than the target pressure, and the leak-down change value ΔP2 is greater than a predetermined value that is greater than the estimated evaporation pressure, the leak judgment process concludes that there is a leak in the evaporation purge system, illuminates the abnormality warning lamp (MIL), and records the obtained result in the memory.

In the present embodiment, also, the MIL does not have to illuminate after a single diagnosis result is obtained. An alternative is to record the previous diagnosis result in the memory, and illuminate the MIL when an abnormality is detected two times in succession.

Step S2013 is provided for a case where the engine starts up during a diagnosis. If the drain path switching valve 143 switches to the pump side in step S2013, it can be judged that a diagnosis is being made.

If it is judged in step S2013 that a diagnosis is being made, the flow proceeds to step S2014. Step S2014 is performed to stop the diagnosis. More specifically, step S2014 is performed to stop the air pump 146, switch the drain path switching valve 143 from the pump side to the atmosphere side, and clear the pump drive time and tank pressure change from the memory.

In the embodiment described above, the pump drive time and pull-down pressure change are used as leak detection parameters. Therefore, an erroneous diagnosis might be made due to pump capability deterioration and inherent error in individual units of the air pump 146.

A device and method for avoiding the aforementioned diagnosis error and detecting an evaporation leak with increased certainty will now be described with reference to FIGS. 19 and 20.

Figure 19:
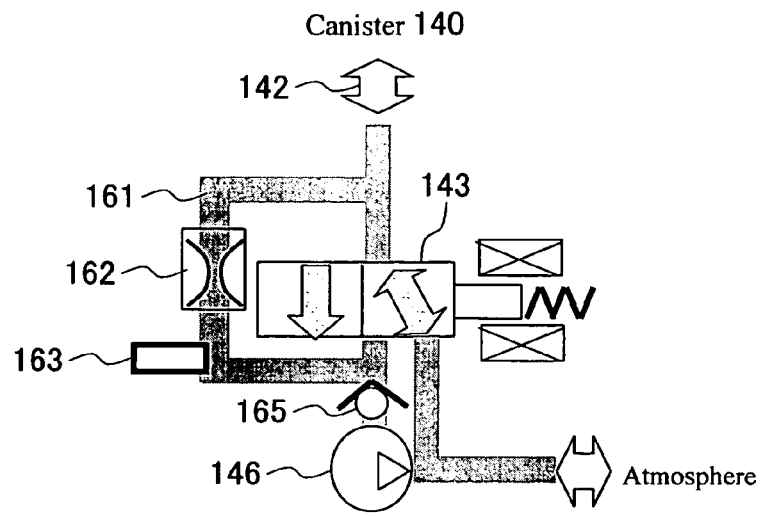
FIG. 19 is a schematic diagram illustrating a detailed configuration of a canister drain switching section of an evaporation purge system to which an evaporation leak diagnostic process according to the present invention is applied.
Figure 20:
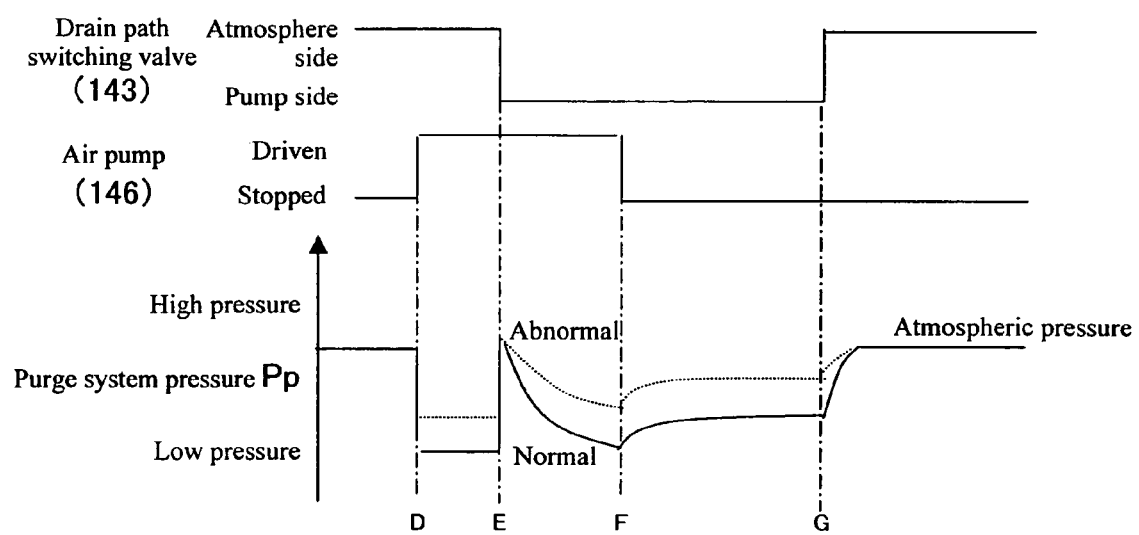
FIG. 20 is a timing diagram illustrating a pump function diagnosis sequence.

FIG. 19 illustrates a detailed configuration of a connection circuit for the air pump 146 and drain path switching valve 143. The drain path switching valve 143 is capable of switching the path for the drain port 140 of the canister 140 to the atmosphere side or pump side. A bypass 161 is connected between the air pump 146 and the drain port 140 of the canister 140, and positioned in parallel with the drain path switching valve 143. This bypass 161 is provided with an orifice 162. A pressure sensor 163 is installed on the air pump side of the orifice 162 of the bypass 161.

When the drain path switching valve 143 switches to the atmosphere side while the air pump 146 is driven, air flows to the bypass 161 via the orifice 162. The pump function can be diagnosed in accordance with a purge system pressure Pp that is detected by the pressure sensor 163 in the above instance.

The output port side of the air pump 146 is equipped with a backflow prevention valve 165. This backflow prevention valve 165 is equivalent to the backflow prevention valve 155 shown in FIG. 2. After the air pump 146 is driven to place the canister side under negative pressure and then stopped, the backflow prevention valve 165 prevents air from flowing into the evaporation purge system. If an evaporation leak diagnostic process is performed in a pressurization mode, the direction of blocking by the backflow prevention valve 165 reverses.

A typical sequence for diagnosing the pump function will now be described with reference to FIG. 20. When the air pump 146 is driven (at time D) with the drain path switching valve 143 set to the atmosphere side, the purge system pressure Pp measured by the pressure sensor 163 is a predetermined low pressure. The value of this pressure is determined by the performance of the air pump 146 and the diameter of the orifice 162. Therefore, when the prevailing purge system pressure Pp is within a predetermined range, the air pump 146 is normal. If, on the other hand, the prevailing purge system pressure Pp is not within a predetermined range, the air pump 146 is abnormal.

When the drain path switching valve 143 subsequently switches to the pump side (at time E), the purge system pressure Pp detected by the pressure sensor 163 increases.

After the elapse of a predetermined period of time (at time F), the pressure change is measured with the air pump 146 stopped. Subsequently, the drain path switching valve 143 switches to the atmosphere side at time G to restore the purge system pressure Pp to the atmospheric pressure level.

If pump capability deterioration is within a predetermined range, leak detection can be achieved by making compensation even when the pump is abnormal. When the aforementioned pump abnormality diagnosis means is available, the evaporation leak diagnostic process can be performed simply by making a pull-down diagnosis.

One of the advantages to using the air pump 146 in accordance with the present invention is that the pressure change reproducibility prevailing during pull-down is higher than during the use of the conventional negative pressure method.

More specifically, when the conventional method is used, the pressure change reproducibility prevailing during pull-down is low because it depends on the intake pipe negative pressure, that is, the engine operation status. It is therefore difficult to make a diagnosis in accordance with the pressure change encountered during pull-down.

However, when the air pump 146 is used, it is possible to achieve depressurization or pressurization at a predetermined ratio. This increases the accuracy of a diagnosis that is made in accordance with the pressure change encountered during pull-down.

It is also possible to determine the fuel properties from the changes in the tank pressure P, which occur during a pull-down diagnosis, and exercise combustion control over the internal combustion engine accordingly.

Figure 21:
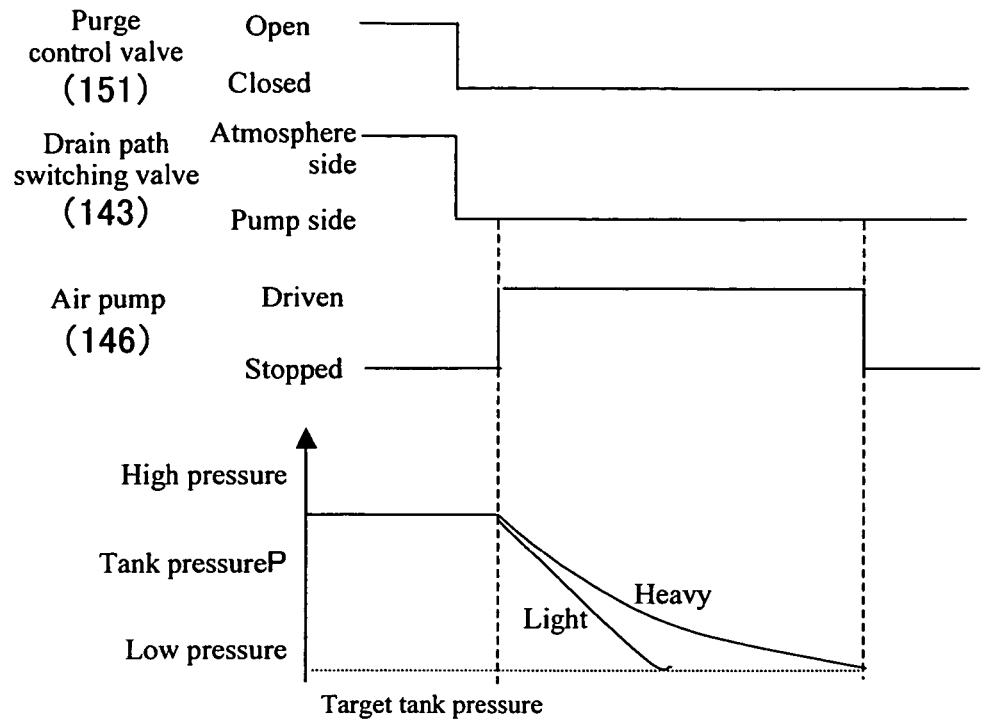
FIGS. 21A and 21B are timing diagrams that schematically illustrate tank pressure changes during pull-down diagnosis.
Figure 21:
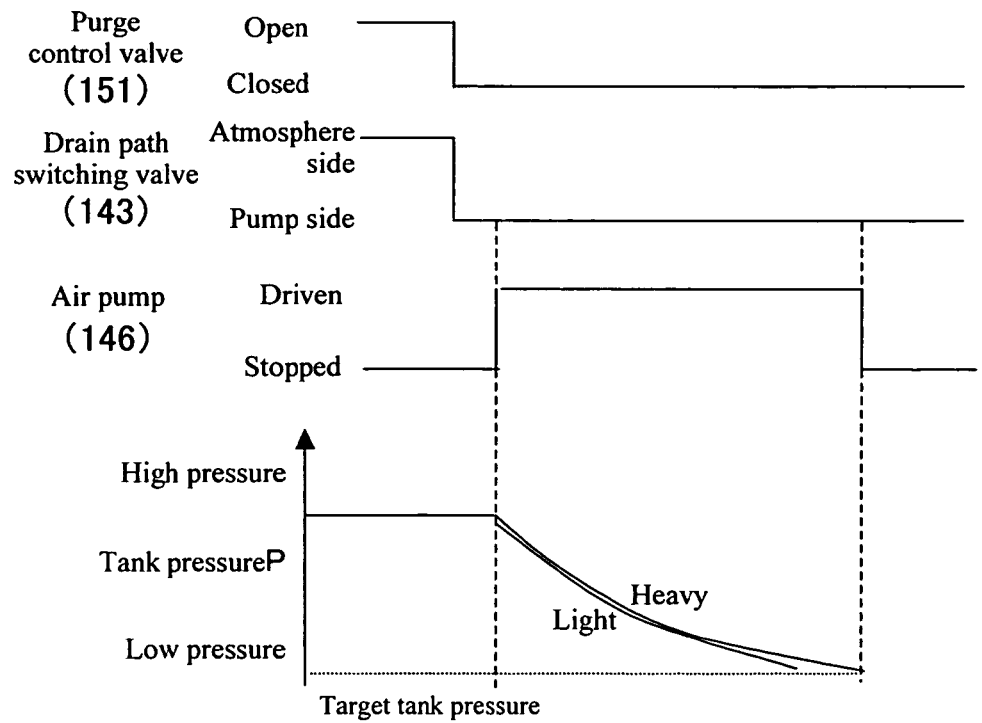

FIGS. 21A and 21B schematically show tank pressure changes that are encountered during a pull-down diagnosis. FIG. 21A illustrates pressure behavior that is exhibited while the tank temperature is high. FIG. 21B illustrates pressure behavior that is exhibited while the tank temperature is low.

When the tank temperature is high, the amount of evaporation is larger during the use of light gasoline than during the use of heavy gasoline as indicated in FIG. 21A. Therefore, the pressure change encountered during pull-down is great. Thus, the pump drive time required for the tank pressure P to reach a target tank pressure is reduced.

On the other hand, when the tank temperature is low, the amount of evaporation during the use of light gasoline is equal to that during the use of heavy gasoline as indicated in FIG. 21B. Thus, the pressure change difference is small.

The above statement is based on a characteristic according to which the pressure change amount increases when the vapor is adsorbed. The amount of evaporation can be estimated from the pressure change during pull-down and used for evaporation correction during a leak-down diagnosis.

Figure 22:
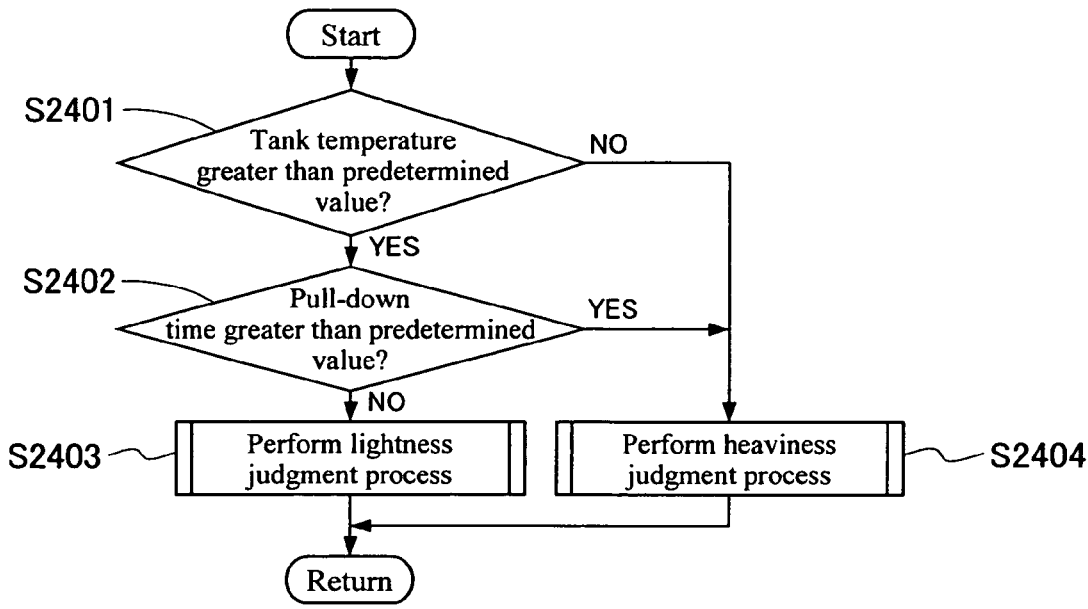
FIG. 22 is a flowchart illustrating one embodiment of a control routine of an internal combustion engine control device.
Figure 23:
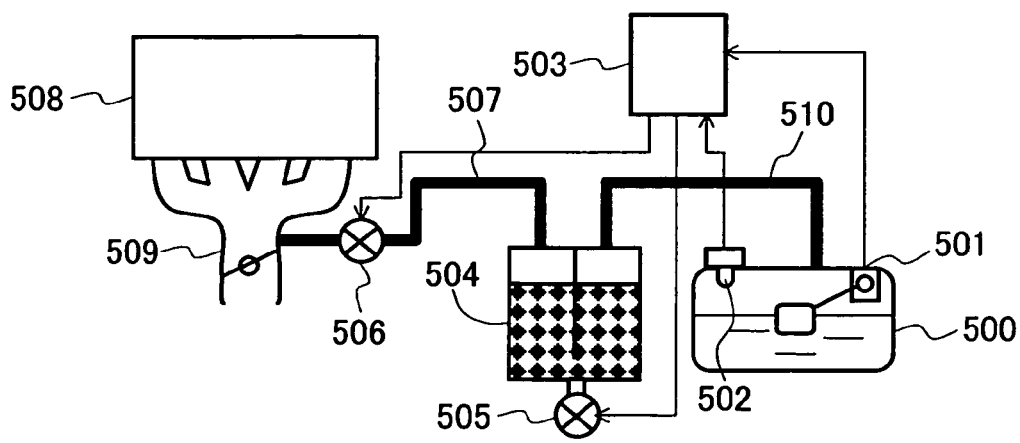
FIG. 23 is a schematic diagram illustrating a conventional evaporation purge system that makes negative pressure type evaporation leak diagnoses.
Figure 24:
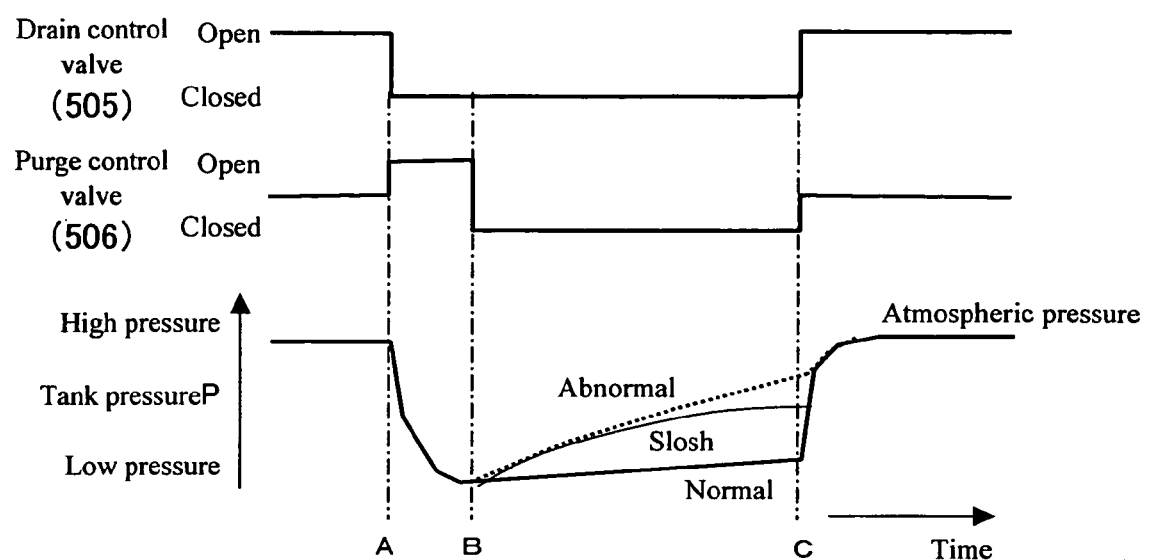
FIG. 24 is a timing diagram illustrating a conventional negative pressure type evaporation leak diagnostic process.

FIG. 22 illustrates a control routine that the internal combustion engine control device executes by making use of the above characteristic. The use of this control routine makes it possible to distinguish between light gasoline and heavy gasoline and adjust the amount of fuel injection for startup.

First of all, step S2401 is performed to judge whether the tank temperature is higher than a predetermined level. If the tank temperature is higher than the predetermined level, the flow proceeds to step S2402. If not, the flow proceeds to step S2404.

Step S2402 is performed to judge whether the pull-down time is greater than a predetermined value. If the pull-down time is greater than the predetermined value, the flow proceeds to step S2404. If not, the flow proceeds to step S2403.

In step S2403, a lightness judgment process is performed. As a result, the amount of fuel injection for startup is made smaller than a normal amount. Thus, it can be expected that the amount of exhaust will decrease without sacrificing startability.

In step S2404, a heaviness judgment process is performed. The amount of fuel injection for startup is then made sufficient for the maintenance of startability. Consequently, it can be expected that stable startup performance will result.

In other words, when the pressure change during pump drive is greater than a predetermined standard value for heavy gasoline or when the pump drive time required before a predetermined pressure is reached is smaller than a predetermined standard value for heavy gasoline, it is judged that the fuel in the fuel tank is light. Thus, the fuel injection amount for startup is set to be smaller than for heavy gasoline.

It is preferred that the above fuel property judgment be formulated when the fuel tank temperature is high (e.g., immediately after vehicle stoppage).

The invention claimed is:

1. An evaporation leak diagnostic device for detecting a fuel vapor leak in an internal combustion engine having an evaporation purge system that includes a fuel tank and a communicating tube, which connects a canister for adsorbing and retaining fuel vapor to an intake pipe, the evaporation leak diagnostic device comprising:
   pressure detection means for detecting the pressure of the evaporation purge system;
   shutout means for shutting out the evaporation purge system from atmospheric air;
   a pump for pressurizing or depressurizing the evaporation purge system; and
   leak judgment means comprising a control unit which drives the pump while the shutout means shuts out the evaporation purge system from atmospheric air, stops the pump when the pressure detected by the pressure detection means reaches a predetermined level, and formulates a leak judgment in accordance with the time the pump is driven and a pressure change encountered after pump stoppage.

2. The evaporation leak diagnostic device according to claim 1, wherein the leak judgment means formulates a leak judgment while the internal combustion engine is stopped.

3. The evaporation leak diagnostic device according to claim 1, wherein the leak judgment means formulates an abnormality judgment for indicating the existence of a leak only when the time for driving the pump is longer than threshold pump drive time and the pressure change encountered after pump stoppage is greater than a threshold pressure change, and formulates a normality judgment for indicating the nonexistence of a leak under the ether normal conditions.

4. The evaporation leak diagnostic device according to claim 3, wherein the leak judgment means sets the threshold pump drive time and the threshold pressure change in accordance with an amount of fuel remaining in the fuel tank at the time of leak judgment.

5. The evaporation leak diagnostic device according to claim 1, wherein the shutout means closes the evaporation purge system while the internal combustion engine is stopped; and wherein the function for formulating a leak judgment is disabled when the pressure change measured without driving the pump is greater than a predetermined value.

6. The evaporation leak diagnostic device according to claim 1, wherein the leak judgment means estimates the charge amount of vapor adsorbed by the canister; and wherein, if the estimated charge amount is greater than a predetermined value, the function for leak judgment is disabled without driving the pump.

7. An evaporation leak diagnostic device for detecting a fuel vapor leak in an internal combustion engine having an evaporation purge system that includes a fuel tank and a communicating tube, which connects a canister for adsorbing and retaining fuel vapor to an intake pipe, the evaporation leak diagnostic device comprising:
   pressure detection means for detecting the pressure of the evaporation purge system; shutout means for shutting out the evaporation purge system from atmospheric air;
   a pump for pressurizing or depressurizing the evaporation purge system; and
   leak judgment means comprising a control unit which drives the pump for a predetermined period of time while the shutout means shuts out the evaporation purge system from atmospheric air, and formulates a leak judgment in accordance with the amount of pressure change that the pressure detection means detects during the time the pump is driven, and the amount of pressure change during a predetermined period of time after pump stoppage.

8. The evaporation leak diagnostic device according to claim 7, wherein the leak judgment means formulates a leak judgment while the internal combustion engine is stopped.

9. The evaporation leak diagnostic device according to claim 7, wherein the leak judgment means formulates an abnormality judgment for indicating the existence of a leak only when the amount of pressure change during the pump drive is greater than a threshold pressure change during the pump drive and the amount of pressure change during a predetermined period of time after pump stoppage is greater than a threshold pressure change after pump stoppage, and formulates a normality judgment for indicating the nonexistence of a leak under normal conditions.

10. The evaporation leak diagnostic device according to claim 7, wherein the leak judgment means sets the pump drive time in accordance with the amount of fuel remaining in the fuel tank at the time of leak judgment.

11. The evaporation leak diagnostic device according to claim 7, wherein the leak judgment means estimates the charge amount of vapor adsorbed by the canister and corrects the pump drive time setting in accordance with the estimated charge amount.

12. The evaporation leak diagnostic device according to claim 11, wherein the leak judgment means estimates the charge amount in accordance with a temperature history of the fuel tank.

13. The evaporation leak diagnostic device according to claim 7, wherein the leak judgment means estimates the amount of vapor generation in the fuel tank and corrects the pump drive time setting in accordance with the estimated amount of vapor generation.

14. The evaporation leak diagnostic device according to claim 7, wherein the shutout means closes the evaporation purge system while the internal combustion engine is stopped; and wherein the function for formulating a leak judgment is disabled when the pressure change measured without driving the pump is greater than a predetermined value.

15. The evaporation leak diagnostic device according to claim 7, wherein the leak judgment means estimates the charge amount of vapor adsorbed by the canister; and wherein, if the estimated charge amount is greater than a predetermined value, the function for formulating a leak judgment is disabled without driving the pump.

16. An evaporation leak diagnostic method for detecting a fuel vapor leak in an internal combustion engine having an evaporation purge system that includes a fuel tank and a communicating tube, which connects a canister for adsorbing and retaining fuel vapor to an intake pipe, the evaporation leak diagnostic method comprising the steps of:

causing pressure detection means to detect the pressure of the evaporation purge system;

causing shutout means to shut out the evaporation purge system from atmospheric air;

driving a pump for pressurization or depressurization purposes while the shutout means shuts out the evaporation purge system from atmospheric air;

stopping the pump when the pressure detected by the pressure detection means reaches a predetermined level; and formulating a leak judgment in accordance with the drive time for the pump and a pressure change encountered after pump stoppage.

17. The evaporation leak diagnostic method according to claim 16, wherein a leak judgment is formulated while the internal combustion engine is stopped.

18. The evaporation leak diagnostic method according to claim 16, wherein an abnormality judgment is formulated to indicate the existence of a leak only when the drive time for the pump is longer than threshold pump drive time and the pressure change after pump stoppage is greater than a threshold pressure change; and wherein, under normal conditions, a normality judgment is formulated to indicate the nonexistence of a leak.

19. An evaporation leak diagnostic method for detecting a fuel vapor leak in an internal combustion engine having an evaporation purge system that includes a fuel tank and a communicating tube, which connects a canister for adsorbing and retaining fuel vapor to an intake pipe, the evaporation leak diagnostic method comprising the steps of:

causing pressure detection means to detect the pressure of the evaporation purge system;

driving a pump for a predetermined period of time to pressurize or depressurize the evaporation purge system while shutout means shuts out the evaporation purge system from atmospheric air; and formulating a leak judgment in accordance with the amount of pressure change that is detected by the pressure detection means during the time the pump is driven and the amount of pressure change during a predetermined period of time after pump stoppage.

20. The evaporation leak diagnostic method according to claim 19, wherein a leak judgment is formulated while the internal combustion engine is stopped.

21. The evaporation leak diagnostic method according to claim 19, wherein an abnormality judgment is formulated to indicate the existence of a leak only when the amount of pressure change during the pump drive is greater than a threshold amount of pressure change during the pump drive and the amount of pressure change during a predetermined period of time after pump stoppage is greater than a threshold amount of pressure change after pump stoppage; and wherein, under normal conditions, a normality judgment is formulated to indicate the nonexistence of a leak.

* * * * *